United States Patent
Machuca et al.

(10) Patent No.: US 10,081,000 B2
(45) Date of Patent: Sep. 25, 2018

(54) METHODS, SYSTEMS, AND APPARATUSES FOR CONTROLLING SUBSTANCE MIXING CONCENTRATION

(71) Applicant: Entegris, Inc., Billerica, MA (US)

(72) Inventors: Francisco Javier Machuca, Oakland, CA (US); Ronald Chiarello, Lafayette, CA (US)

(73) Assignee: Entegris, Inc., Billerica, MA (US)

( * ) Notice: Subject to any disclaimer, the term of this patent is extended or adjusted under 35 U.S.C. 154(b) by 401 days.

(21) Appl. No.: 14/443,204

(22) PCT Filed: Nov. 15, 2013

(86) PCT No.: PCT/US2013/070446
§ 371 (c)(1),
(2) Date: May 15, 2015

(87) PCT Pub. No.: WO2014/078750
PCT Pub. Date: May 22, 2014

(65) Prior Publication Data
US 2015/0298082 A1 Oct. 22, 2015

Related U.S. Application Data

(60) Provisional application No. 61/727,630, filed on Nov. 16, 2012.

(51) Int. Cl.
*B01F 15/00* (2006.01)
*B01F 15/04* (2006.01)
(Continued)

(52) U.S. Cl.
CPC ...... *B01F 15/0429* (2013.01); *B01F 15/0022* (2013.01); *B01F 15/00233* (2013.01);
(Continued)

(58) Field of Classification Search
USPC ............................................. 366/152.3, 152.1
See application file for complete search history.

(56) References Cited

U.S. PATENT DOCUMENTS

| | | | |
|---|---|---|---|
| 4,455,091 | A | 6/1984 | Bamberger et al. |
| 5,284,174 | A | 2/1994 | Norman |

(Continued)

FOREIGN PATENT DOCUMENTS

| | | |
|---|---|---|
| CN | 1085330 | 4/1994 |
| CN | 1204408 A | 1/1999 |

(Continued)

OTHER PUBLICATIONS

Notice of Allowance issued for Taiwanese Patent Application No. 102141922, dated Dec. 14, 2015, 4 pages.
(Continued)

*Primary Examiner* — Mark Halpern
(74) *Attorney, Agent, or Firm* — Entegris, Inc.

(57) ABSTRACT

Embodiments provide mixing methods, systems, apparatuses, devices and assemblies that enable high-accuracy mixing of two or more substances in a manner that controls the concentrations of one or more substances in the resulting mixture. A mixing apparatus (100) may enable mixing of two or more substances at a mixing zone or conduit (112). The mixing apparatus may include one or more sensors (120) for detecting one or more characteristics of the mixture during the mixing process. The sensors may detect the mixture characteristics continuously, at intervals or as prompted by a user. The mixture characteristics may be used, in the sensors or in control circuitry, to generate an indication of the concentration of a first constituent substance in the mixture. Based on the detected concentration, the mixing apparatus may automatically adjust a supply of the first substance to the mixing zone or conduit (112).

9 Claims, 9 Drawing Sheets

(51) Int. Cl.
*G05D 11/13* (2006.01)
*B01F 15/02* (2006.01)

(52) U.S. Cl.
CPC .. *B01F 15/00246* (2013.01); *B01F 15/00253* (2013.01); *B01F 15/00259* (2013.01); *B01F 15/00285* (2013.01); *B01F 15/00292* (2013.01); *B01F 15/026* (2013.01); *G05D 11/138* (2013.01); *B01F 2015/0221* (2013.01)

(56) References Cited

U.S. PATENT DOCUMENTS

| | | | |
|---|---|---|---|
| 5,482,368 | A | 1/1996 | Nakamura |
| 7,916,285 | B2 | 3/2011 | Amamiya et al. |
| 2002/0144727 | A1 | 10/2002 | Kashkoush et al. |
| 2003/0199646 | A1 | 10/2003 | Kougo |
| 2003/0199649 | A1* | 10/2003 | Orbison ............... G01N 21/05 526/123.1 |
| 2004/0218173 | A1 | 11/2004 | Fisher et al. |
| 2005/0222287 | A1 | 10/2005 | Roberts |
| 2007/0070330 | A1 | 3/2007 | Chiarello et al. |
| 2007/0070803 | A1 | 3/2007 | Urquhart |
| 2007/0246230 | A1 | 10/2007 | Roberts |
| 2010/0296079 | A1 | 11/2010 | Chiarello et al. |

FOREIGN PATENT DOCUMENTS

| | | |
|---|---|---|
| CN | 11643367 | 7/2005 |
| CN | 1981968 A | 6/2007 |
| CN | 101490422 A | 7/2009 |
| CN | 101490422 A | 7/2009 |
| CN | 101852721 A | 10/2010 |
| CN | 102361910 | 2/2012 |
| EP | 0584052 | 2/1994 |
| GB | 2084035 B | 4/1982 |
| JP | H07-260732 A | 10/1995 |
| JP | H09-094451 A | 4/1997 |
| JP | H11-224874 A | 8/1999 |
| JP | 2000183017 A | 6/2000 |
| JP | 2006-521875 A | 9/2006 |
| JP | 2007-537780 A | 12/2007 |
| JP | 2008-535660 A | 9/2008 |
| JP | 2009-510556 A | 3/2009 |
| TW | 200912278 | 3/2009 |
| TW | 201126575 | 8/2011 |
| TW | M429476 A | 8/2011 |
| TW | M429476 | 5/2012 |
| WO | WO 03083451 | 10/2003 |
| WO | 2004/084752 A2 | 10/2004 |
| WO | 2006/109144 A1 | 10/2006 |
| WO | 2007/034304 A1 | 3/2007 |
| WO | WO2007135513 A1 | 11/2007 |
| WO | WO 2014078750 | 5/2014 |

OTHER PUBLICATIONS

Translation of search report from Taiwan patent application 105101083, dated Oct. 7, 2016, 2 pages.
International Search Report and Written Opinion issued for PCT Application No. PCT/US2013/070446, dated Feb. 17, 2014, 19 pages.
Office Action issued for Taiwanese Patent Application No. 102141922, dated Feb. 24, 2015, 5 pages.
International Preliminary Report on Patentability issued for PCT Application No. PCT/US2013/070446, dated May 19, 2015, 12 pages.
Office Action issued for Chinese Patent Application No. 201380070592.8, dated Apr. 19, 2016, 34 pages.

* cited by examiner

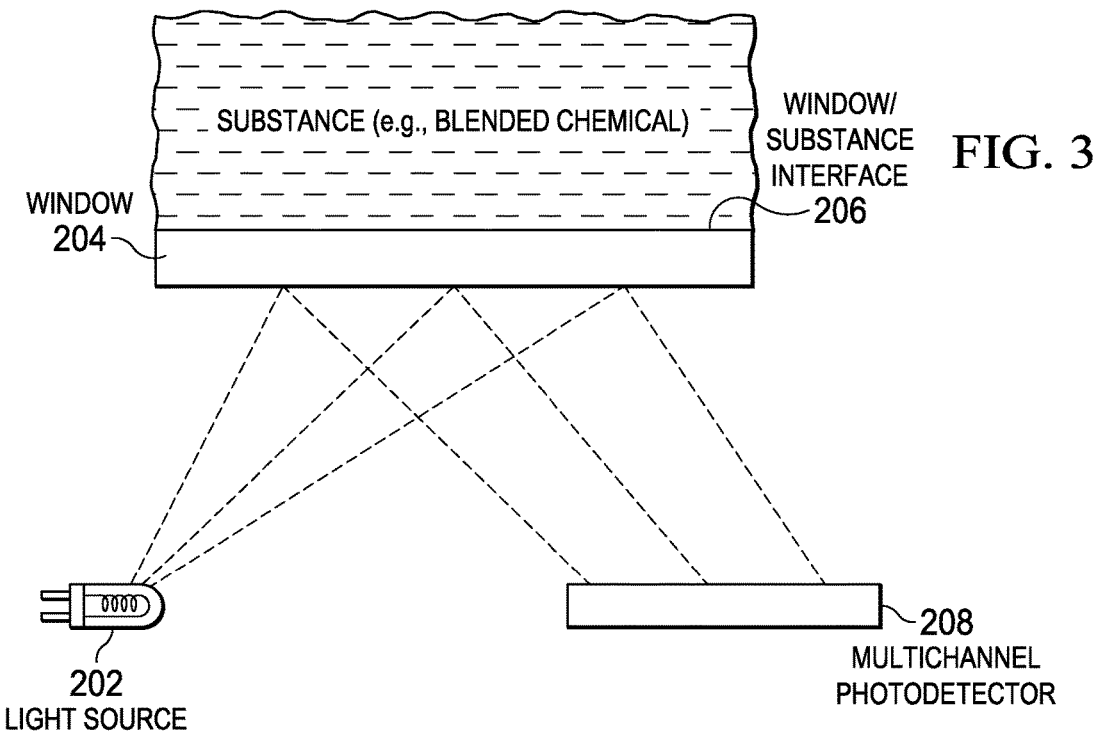
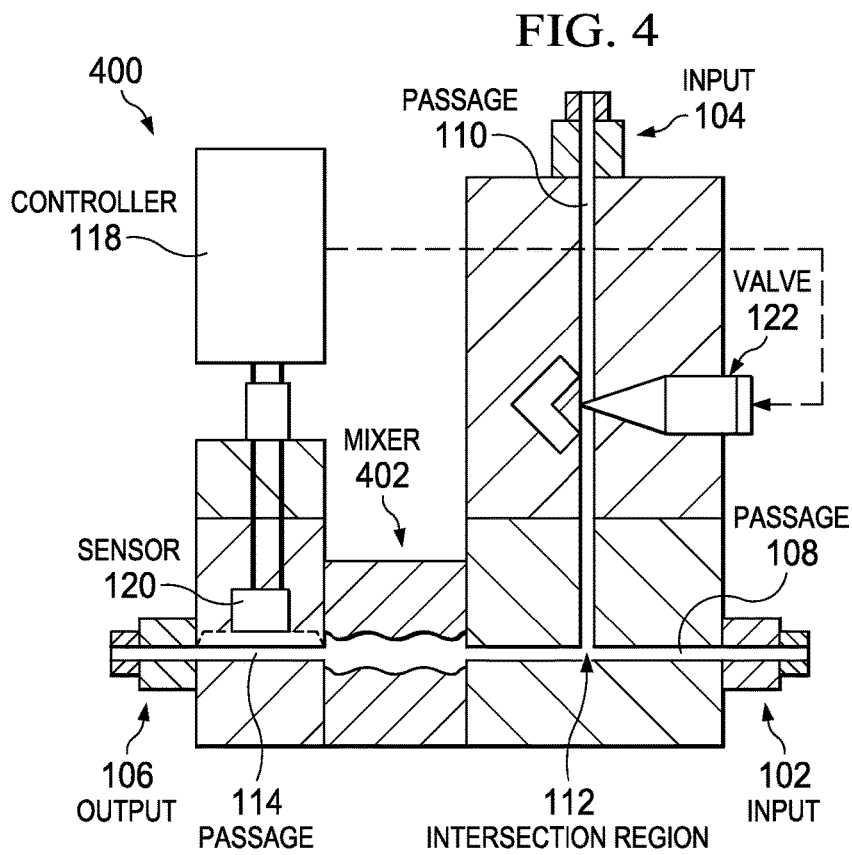

METHODS, SYSTEMS, AND APPARATUSES FOR CONTROLLING SUBSTANCE MIXING CONCENTRATION

CROSS-REFERENCE TO RELATED APPLICATIONS

This application is a 371 PCT/US2013/070446 filed Nov. 15, 2013, entitled "CONTROLLING MIXING CONCENTRATION," and claims the benefit of priority to U.S. Provisional Patent Application No. 61/727,630, filed Nov. 16, 2012, the entire contents of which are expressly incorporated herein by reference.

TECHNICAL FIELD

Embodiments of the invention generally relate to high-accuracy mixing of substances.

BACKGROUND

High-accuracy mixing of substances is important in a wide variety of technical fields, including microelectronics (in the formation of semiconductors, flat panel displays, disk drives, solar cells, and the like), life sciences (pharmaceutical, biotechnology and personal care, among others), chemical engineering and petrochemical engineering. For example, manufacturing innovations, such as single wafer processing in semiconductor manufacturing and continuous reaction processes in pharmaceutical manufacturing, often require chemical substances to be mixed in precise proportions.

SUMMARY

Exemplary embodiments provide mixing methods, systems, apparatuses, devices and assemblies that enable high-accuracy mixing of two or more substances in a manner that controls the concentrations of one or more substances in the resulting mixture. Exemplary embodiments also include a mixing assembly including two or more mixing apparatuses, each mixing apparatus configured for mixing two or more substances.

In accordance with one exemplary embodiment, a method is provided for mixing a plurality of substances. The method may include determining a target concentration for a first input substance in a post-mixing substance, the post-mixing substance resulting from the first input substance being mixed with a second input substance. The method may include continuously determining a post-mixing concentration value of the first input substance in the post-mixing substance while the first input substance is being mixed with the second input substance. The method may also include monitoring the post-mixing concentration value to determine whether a post-mixing concentration is outside a predetermined target concentration range or a margin of error of the target concentration, and adjusting a control valve configured to control pre-mixing flow rate of the first input substance when the post-mixing concentration is determined to be outside the predetermined target concentration range or a margin of error of the target concentration.

In some embodiments, the method may include adjusting the control valve may include adjusting a position of the control valve based on one or more control parameters. The method may further include creating at least one adjusted control parameter for at least one of the one or more control parameters after determining that the post-mixing concentration is outside the predetermined target concentration range or a margin of error of the target concentration, and adjusting the control valve based on the adjusted control parameter.

In some embodiments, the method may further include determining a difference value between the post-mixing concentration and the target concentration, determining a feedback control value based on the difference value and the adjusted control parameter, and adjusting the control valve based on the feedback control value.

In some embodiments, the method may further include generating an average post-mixing concentration based on a predetermined number of determined post-mixing concentration values. Furthermore, the method may include monitoring the average post-mixing concentration to determine that the post-mixing concentration is outside a predetermined target concentration range or a margin of error of the target concentration.

In some embodiments, the method may further include determining a flow rate of the second input liquid, and setting an initial position for the control valve based on the determined flow rate.

In some embodiments, the method may further include passing the post-mixing substance through a static mixer prior to measuring the post-mixing substance, thereby increasing the accuracy of the post-mixing concentration value.

In some embodiments, the second input substance may be an output substance, such as may be received from a different mixing apparatus.

In some embodiments, the method may further include measuring optical reflectivity and temperature of the post-mixing substance, determining an index of refraction of the post-mixing substance based on the optical reflectivity and temperature, and determining the post-mixing concentration value of the first input substance in the post-mixing substance based on the index of refraction.

In some embodiments, adjusting the control valve configured to control pre-mixing flow rate of the first input substance is independent from a measured flow rate of the first input substance.

In accordance with another exemplary embodiment, a method is provided for controlled mixing of a plurality of substances to produce a first mixture. The method may include receiving a first target concentration range of a first substance in the mixture of the plurality of substances, and supplying the plurality of substances to a first mixing zone, the plurality of substances mixing in the first mixing zone to produce the first mixture. The method may also include determining a concentration value of the first substance in the first mixture while continuing to supply the plurality of substances to the first mixing zone, and comparing the concentration value of the first substance to the first target concentration range. The method may further include, based on a determination that the concentration value of the first substance falls outside the first target concentration range, automatically adjusting supply of the first substance to the first mixing zone.

In some embodiments, the method may determine the concentration value of the first substance in the first mixture by detecting one or more characteristic physical properties of the first mixture, and determining the concentration value of the first substance in the first mixture based on the one or more characteristic physical properties of the first mixture. The one or more characteristic physical properties may be selected from a group including temperature, dew point, concentration, speed of sound in the first mixture, optical reflectivity and index of refraction.

In some embodiments, the method may determine the concentration value of the first substance in the first mixture by detecting an optical reflectivity of the first mixture, detecting a temperature of the first mixture, determining an index of refraction of the first mixture based on the optical reflectivity and the temperature of the first mixture, and determining the concentration value of the first substance in the first mixture based on the index of refraction.

In some embodiments, the supply of the first substance to the first mixing zone may be adjusted by adjusting a control valve provided at a first conduit supplying the first substance to the first mixing zone, the control valve configured to control a flow rate of the first substance through the first conduit. In some embodiments, the control valve may be adjusted by controlling an opening size of the control valve based on the concentration value of the first substance in the first mixture and based on one or more physical characteristics of at least one of the plurality of substances. The one or more physical characteristics of at least one of the plurality of substances may include viscosity, density, specific gravity, chemical composition, temperature and pressure. In some embodiments, the control valve may be adjusted by controlling an opening size of the control valve based on the concentration value of the first substance in the first mixture and based on one or more physical characteristics of a mixing system in which the first mixture is produced, wherein the one or more physical characteristics are selected from a group comprising a size of a first conduit through which the first substance is supplied to the mixing zone, a type of the mixing zone and a type of the control valve.

In some embodiments, the control valve may be adjusted by controlling an opening size of the control valve based on the concentration value of the first substance in the first mixture, one or more physical characteristics of a mixing system in which the first mixture is produced, and one or more physical characteristics of at least one of the plurality of substances.

In some embodiments, the method may include determining a second concentration value of the first substance in the first mixture while continuing to supply the plurality of substances to the first mixing zone, comparing the second concentration value of the first substance to the first target concentration range, and upon determining that the second concentration value of the first substance falls outside the first target concentration range, automatically adjusting the opening size of a control valve provided at a first conduit for supplying the first substance to the first mixing zone, the opening size of the control valve adjusted based on the second concentration value of the first substance in the first mixture.

In some embodiments, the method may include receiving a second target concentration range of a second substance in the first mixture of the plurality of substances, determining a concentration value of the second substance in the first mixture while continuing to supply the plurality of substances to the first mixing zone, comparing the concentration value of the second substance to the second target concentration range, and based on a determination that the concentration value of the second substance falls outside the second target concentration range, automatically adjusting supply of the second substance to the first mixing zone.

In some embodiments, the method may include supplying the first mixture to a second mixing zone, supplying a third substance to the second mixing zone, the first mixture and the third substance mixing in the second mixing zone to produce a second mixture, receiving a third target concentration range of the third substance in the second mixture, determining a concentration value of the third substance in the second mixture while continuing to supply the first mixture and the third substance to the second mixing zone, comparing the concentration value of the third substance to the third target concentration range, and based on a determination that the concentration value of the third substance falls outside the third target concentration range, automatically adjusting supply of the third substance to the second mixing zone.

In accordance with another exemplary embodiment, a method is provided for mixing of a plurality of substances. The method may include receiving a first target concentration range of a first substance in the mixture of the plurality of substances, and supplying the plurality of substances to a first mixing zone, the plurality of substances mixing in the first mixing zone to produce the first mixture. The method may also include determining a concentration value of the first substance in the first mixture while continuing to supply the plurality of substances to the first mixing zone, and comparing the concentration value of the first substance to the first target concentration range. The method may further include, upon determining that the concentration value of the first substance falls outside the first target concentration range, automatically adjusting a flow rate of the first substance to the first mixing zone by adjusting an opening size of a control valve provided at a first conduit for supplying the first substance to the first mixing zone. The opening size of the control valve may be adjusted based on the concentration value of the first substance in the first mixture and based on one or more physical characteristics of at least one of the plurality of substances. The one or more physical characteristics of the at least one of the plurality of substances may be selected from a group comprising viscosity, density, specific gravity, chemical composition, temperature and pressure.

In accordance with another exemplary embodiment, a mixing system is provided. The mixing system may include a first mixing conduit, a first supply conduit coupled to and disposed upstream of the first mixing conduit, the first supply conduit including a bore for supplying a first substance to the first mixing conduit, a first flow control device provided at the first supply conduit, the first flow control device configured to selectively adjust an opening of the bore of the first supply conduit, and a second supply conduit coupled to and disposed upstream of the first mixing conduit, the second supply conduit including a bore for supplying a second substance to the first mixing conduit. The mixing system may also include a first set of one or more sensors provided at the first mixing conduit for detecting one or more characteristics of a first mixture produced by mixing of the first and second substances. The mixing system may further include first control circuitry operatively coupled to the first set of one or more sensors and to the first flow control device, the first control circuitry programmed to automatically control the first flow control device to adjust a flow rate of the first substance based on the one or more detected characteristics of the first mixture at the first mixing conduit.

In some embodiments, the one or more detected characteristics of the first mixture may be selected from a group comprising temperature, dew point, concentration, speed of sound in the first mixture, optical reflectivity and index of refraction.

The mixing conduit may include an intersection region at which the substances first come into contact for mixing. One or more microsensors are preferably located as close as possible to the intersection region but a sufficient distance away from the intersection region to ensure mixing of the substances before the concentration is detected. In one exemplary non-limiting embodiment, the microsensor may be disposed about one inch to about two inches from the intersection region. This ensures tight coupling between the mixing process and any adjustments made in the supply of the substances, so that the adjusted supply affects the mixing process before a substantial volume of the mixture flows past the intersection region. As a result, the concentrations of substances in the mixture are tightly controlled throughout the mixing process and, in certain embodiments, a mixing tank may be eliminated.

In some embodiments, the first control circuitry may be programmed to determine a concentration value of the first substance in the first mixture based on the one or more detected characteristics of the first mixture, compare the concentration value of the first substance to a first target concentration range for the first substance, and based on a determination that the concentration value of the first substance falls outside the first target concentration range, automatically control the first flow control device to adjust the opening of the bore of the first supply conduit.

In some embodiments, the first set of one or more sensors may include an optical system configured to detect an optical reflectivity of the first mixture, and a thermistor or a thermometer for detecting a temperature of the first mixture. The first control circuitry is programmed to determine an index of refraction of the first mixture based on the optical reflectivity and the temperature of the first mixture, and to determine the concentration value of the first substance in the first mixture based on the index of refraction.

In some embodiments, the first control circuitry may be programmed to control the first flow control device based on the concentration value of the first substance in the first mixture and based on one or more physical characteristics of at least one of the plurality of substances, wherein the one or more physical characteristics are selected from a group comprising viscosity, density, specific gravity, chemical composition, temperature and pressure.

In some embodiments, the first control circuitry may be programmed to control the first flow control device based on the concentration value of the first substance in the first mixture and based on one or more physical characteristics of the mixing system, wherein the one or more physical characteristics are selected from a group comprising a size of the first supply conduit, a type of the first mixing conduit and a type of the first flow control device.

In some embodiments, one or more of the sensors may be operated at predetermined intervals to detect the one or more characteristics of the first mixture during mixing of the first and second substances in the first mixing conduit.

In some embodiments, the mixing system may also include a second flow control device provided at the second supply conduit, the second flow control device configured to selectively adjust an opening of the bore of the second supply conduit. The first control circuitry may be operatively coupled to the second flow control device, the first control circuitry programmed to automatically control the second flow control device to adjust a flow rate of the second substance based on the one or more detected characteristics of the first mixture at the first mixing conduit.

In some embodiments, the first control circuitry may be programmed to determine a concentration value of the second substance in the first mixture based on the one or more detected characteristics of the first mixture, compare the concentration value of the second substance to a second target concentration range for the second substance, and based on a determination that the concentration value of the second substance falls outside the second target concentration range, automatically control the second flow control device.

In some embodiments, the mixing system may also include a second mixing conduit coupled to and disposed downstream of the first mixing conduit, a third supply conduit coupled to and disposed upstream of the second mixing conduit, the third supply conduit including a bore for supplying a third substance to the second mixing conduit, a third flow control device provided at the third supply conduit, the third flow control device configured to selectively control an opening of the bore of the third supply conduit, a second set of one or more sensors provided at the second mixing conduit for detecting one or more characteristics of a second mixture produced by mixing of the first mixture and the third substance, and second control circuitry operatively coupled to the second set of one or more sensors and to the third flow control device, the second control circuitry programmed to automatically control the third flow control device to adjust a flow rate of the third substance based on the one or more detected characteristics of the second mixture at the second mixing conduit.

In some embodiments, the mixing system may also include a mixing device disposed at the first mixing conduit, the mixing device configured to mix the first and second substances. In these embodiments, the first set of one or more sensors may be disposed downstream of the mixing device.

In some embodiments, the mixing system may also include a flow control sensor provided at the second supply conduit, the flow control sensor configured to detect a flow rate of the second substance in the second supply conduit, and a second flow control device provided at the second supply conduit, the second flow control device configured to selectively adjust an opening of the bore of the second supply conduit based on the flow rate detected by the flow control sensor.

In accordance with another exemplary embodiment, a mixing apparatus is provided for mixing of a plurality of substances. The mixing apparatus may include a first input port for introduction of a first substance into the mixing apparatus, a second input port for introduction of a second substance into the mixing apparatus, and an output port for outputting a mixture of the first and second substances from the mixing apparatus. The mixing apparatus may also include a first flow passage including a first terminal end coupled to the first input port and a second terminal end, a control valve disposed at the first flow passage and configured to control an bore of the first flow passage at the control valve, and a second flow passage including a first terminal end coupled to the second input port and a second terminal end. The mixing apparatus may also include an intersection region disposed downstream of the first and second flow passages, the intersection region formed by intersection of the second terminal end of the first flow passage and the second terminal end of the second flow passage. The mixing apparatus may also include a post-mixing passage disposed downstream of the intersection region and upstream of the output port of the mixing apparatus. The mixing apparatus may further include a concentration sensor disposed at the post-mixing passage, the concentration sensor configured to periodically detect an indication of a concentration of the first substance at the post-mixing passage, and control circuitry configured to programmatically receive the indication of the concentration of the first substance and to automatically control the control valve to adjust supply of the first substance to the intersection region based on the indication of the concentration.

Some embodiments may include one or more machines, such as an apparatus and/or system, configured to implement the methods and/or other functionality discussed herein. For example, the machine may include one or more processors, circuitry and/or other machine components configured to implement the functionality discussed herein based on instructions and/or other data stored in memory and/or other non-transitory computer readable media.

These characteristics as well as additional features, functions, and details of the present invention are described below. Similarly, corresponding and additional embodiments are also described below.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which:

FIG. 3 shows an optical reflectivity geometry and a principle of operation of an optical sensor, in accordance with some embodiments;

FIG. 4 shows an example mixing apparatus, configured in accordance with some embodiments;

Figure 1A:
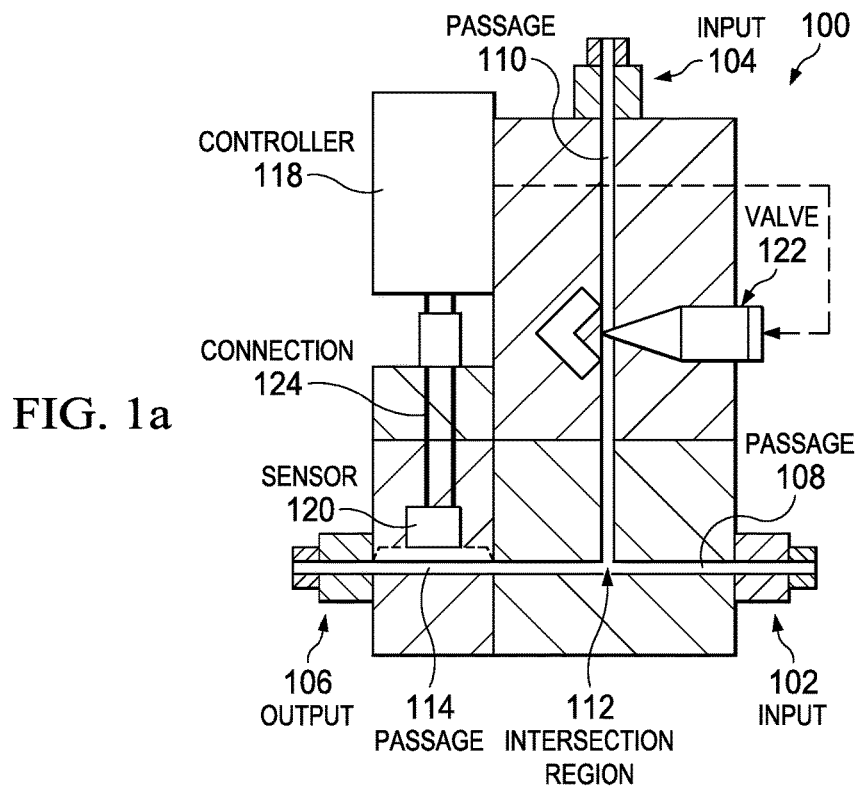
FIG. 1a shows an example of a mixing apparatus, configured in accordance with some embodiments.

The accompanying drawings are not intended to be drawn to scale.

DETAILED DESCRIPTION

Embodiments provide mixing methods, systems, apparatuses, devices and assemblies that enable high-accuracy mixing of two or more substances in a manner that controls the concentrations of one or more substances in the resulting mixture. An exemplary mixing apparatus may enable mixing of two or more substances at a mixing zone or conduit. The mixing apparatus may include one or more sensors for detecting one or more characteristics of the mixture during the mixing process. The sensors may detect the mixture characteristics continuously, at intervals or as prompted by a user. The mixture characteristics may be used, in the sensors or in control circuitry, to generate an indication of the concentration of a first constituent substance in the mixture. Based on the detected concentration, the mixing apparatus may automatically and in real-time adjust a supply of the first substance to the mixing zone or conduit. For example, if the concentration of the first substance falls outside a desired concentration range, the mixing apparatus may adjust the supply (for example, flow rate) of the first substance so that its concentration in the mixture is adjusted accordingly. On the other hand, if the concentration of the first substance is within the desired concentration range, the mixing apparatus may leave the supply (for example, flow rate) of the first substance unadjusted.

Exemplary embodiments enable dynamic adjustment of the mixing apparatus. In one exemplary embodiment, a control valve position that controls the flow rate of an input substance may be set for a target concentration (or a target concentration range) based on one or more control parameters. After mixing, a measured concentration may be compared against the targeted concentration (or the target concentration range) to adjust the control parameters, thereby recalibrating the control valve. As such, some embodiments may provide integrated testing, failure analysis, and/or automatic correction during mixing.

In certain embodiments, a mixing assembly may be provided which includes a plurality of modular mixing apparatuses or devices, each of which is configured to controllably mix two or more substances. In an exemplary series assembly, each mixing apparatus may be coupled to another mixing apparatus in series so as to supply a mixture to the other mixing apparatus or receive a mixture from the other mixing apparatus. The assembly thereby enables a mixture produced in one apparatus to be used in producing another mixture in a subsequent apparatus. In an exemplary parallel assembly, the mixing apparatuses in the assembly may be coupled to one another in parallel so that the resulting mixtures of the apparatuses may be collected in a central location. The assembly thereby enables scaling up of the volume of mixture production. In some embodiments, each modular mixing apparatus in a mixing assembly may have a plug-and-play configuration that may be plugged into or otherwise coupled to other apparatuses in order to scale up the overall mixture production capacity.

The exemplary closed-loop system of detection of the concentration and adjustment of the supply of constituent substances may be used to continually monitor and adjust the mixing process in real-time, that is, without any intentional delay while the mixing process is continuing. This enables high-accuracy mixing suitable for many sophisticated technical and manufacturing needs. The automatic closed-loop nature of the monitoring and control allows the mixing process to run with little or no human intervention, and thereby achieve consistency of performance and precise control over the composition of the resulting mixture. Additionally, the detection and use of physical characteristics or properties of the mixture or the post-mixing substance (including, but not limited to, optical reflectivity, index of refraction, temperature, and concentration) in exemplary embodiments enable higher accuracy in the mixing process than conventional techniques that adjust the mixing process based solely on the flow rates of the input substances.

Certain exemplary mixing apparatuses are able to operate with a smaller footprint than the footprint required for conventional mixing apparatuses. The high accuracy and low response times of an exemplary mixing apparatus allow mixing without the need for a mixing tank that serves as a temporary output substance container while the mixture or output substance is reaching its target concentration. As such, some embodiments may reduce space requirements when space is at a premium, such as for pharmaceutical and/or wafer manufacturing processes that require a sterile environment.

Other advantages that may be realized in some embodiments include an integrated mixing system that provides lower costs (for example, by using low cost concentration sensors with high accuracy), integrated electronics, firmware and software, faster time to ramp, faster time to target concentration (for example, by using dynamically updating control parameters that may change over time as the mixing apparatus undergoes wear-and-tear), signal analysis (for example, time, cross reference, averaging, background subtractions, normalizations and other manipulations to measured data), redundancies made possible in simultaneous, real-time measurements, single point of failure for electronics, firmware, fewer parts (for example, by not requiring the use of mixing tanks and/or liquid flow sensors), fewer physical connections for more convenient communications, less packaging, reduced points for leaking and/or contamination, easier assembly and test, electronics that may be remote from the flow cell, a fully integrated I/O for communication, data management and signal analysis, single bus architecture, single power supply, and a master software program that may be loaded into memory and executed by processing circuitry.

Exemplary mixing methods, systems, apparatuses and assemblies may be used to controllably mix any desired number of substances including, but not limited to, 2, 3, 4, 5, 6, 7, 8, 9, 10, 11, 12, 13, 14, 15, and the like.

Exemplary mixing methods, systems, apparatuses and assemblies may be used to mix substances of any suitable volume including, but not limited to, about 1 mL to about 500 L, but not limited to this exemplary range. An exemplary mixing region (including, for example, intersection region 112 and post-mixing substance passage 114 in FIG. 1a) may accommodate substance volumes including, but not limited to, about 1 mL to about 500 L. Certain exemplary mixing regions may accommodate substances volumes including, but not limited to, about 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300 L, any intermediate volumes, and the like.

One of ordinary skill in the art will recognize that the above numerical values and ranges are illustrative and not intended to limit the scope of the invention.

Certain terms are defined in this section to facilitate understanding of exemplary embodiments.

The term "substance," as used herein, refers to any type of physical matter or material. Example substances may include chemicals (for example, a substance with a distinct molecular composition), individual elements, chemical compounds including two or more different chemical elements, chemical solutions, non-chemicals and/or anything else that may be measured by a concentration sensor. Many of the examples herein are based on substances in the liquid form, but embodiments can be adapted to for a substance in any state (for example, liquid, solid, plasma, and/or gas).

The terms "mixture" and "post-mixing substance," as used herein, refer interchangeably to a result of the mixing of two or more substances.

The terms "liquid flow control" and "liquid flow controller," as used herein, refer to apparatuses configured to measure input flow rate and to control the input flow rate based on the measured input flow rate. As such, liquid flow controls may include a flow control valve, a flow sensor, and a flow controller. The flow controller opens and closes the flow control valve based on flow measurements of an input liquid (for example, pre-mixing measurements) by the flow sensor, which controls the rate that the input liquid is added to the output. The flow of input liquid, however, is only a rough indicator of post-mixing concentration and its use in substance mixing stems mostly from the availability of low cost flow sensors. In that sense, embodiments provide for mixing apparatus that include low-cost, high accuracy, concentration sensors.

The term "measurement data," as used herein, refers to any property of substances that may be measured (for example, by concentration sensor 120 and/or other types of sensors that may be included in mixing apparatus 100).

The term "concentration data," as used herein, refers to data that indicates a concentration value of a first input substance in a post-mixing substance that is a mixture of the first substance and one or more other substances (for example, optical reflectivity and index of refraction).

The term "control parameter," as used herein, refers to one or more constants and/or functions that may indicate and/or provide a relationship (for example, a mapping) between control valve opening size and mixed concentration.

The term "mixing parameter," as used herein, refers to a value associated with a factor that may affect the relationship between motor turn count and mixed concentration.

The term "post-mixing concentration value," as used herein, refers to a single post-mixing concentration value or an average of two or more single concentration values.

The term "set," as used herein, refers to a collection of one or more items.

The term "plurality," as used herein, refers to two or more items.

The terms "equal" and "substantially equal," as used herein, refer interchangeably, in a broad lay sense, to exact equality or approximate equality within some tolerance.

The terms "similar" and "substantially similar," as used herein, refer interchangeably, in a broad lay sense, to exact sameness or approximate similarity within some tolerance.

The terms "couple," "coupled" and "coupling," as used herein, refer to a direct or indirect connection among two or more components. For example, a first component may be coupled to a second component directly or through one or more intermediate components.

The term "module," as used herein, encompasses hardware, software and/or firmware configured to perform one or more particular functions.

The term "computer-readable medium," as used herein, refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below. Like numbers refer to like elements throughout.

FIG. 1a shows an example of a mixing apparatus 100, configured in accordance with some embodiments. Mixing apparatus 100 may be configured to combine a first input substance ("substance A") with a second input substance ("substance B") to produce an output substance at a targeted concentration. As such, mixing apparatus 100 may include substance A input 102, substance B input 104 and substance output 106. Substance A input 102 may be configured to receive substance A. After entering though substance A input 102, substance A may traverse through substance A passage 108. Substance B input 104 may be configured to receive substance B, which may traverse through substance B passage 110. Substance A passage 108 and substance B passage 110 may meet at intersection region 112, where substance A and substance B may combine to form the post-mixing substance, which may traverse through post-mixing substance passage 114. The post-mixing (or "mixed") substance may then be output at substance output 106.

In some embodiments, one of the input substances (for example, substance A) may be configured to flow at a constant rate while the other input substance (for example, substance B) may be configured to flow at a variable rate that is controlled by mixing apparatus 100. As such, mixing apparatus 100 may further include control circuitry 118, one or more concentration sensors 120 and control valve 122 to control the variable flow rate.

Control circuitry 118 may be included within the housing of concentration sensor 120 and/or pre-mixing control valve 122. Additionally or alternatively, at least a portion of control circuitry 118 can be included in a separate housing, thereby forming an independent mixing control apparatus, that is communicatively coupled with concentration sensor 120 and pre-mixing control valve 122 (hereinafter, "control valve"). Control circuitry 118 is discussed further in connection with FIG. 10.

One or more concentration sensors 120 may be configured to monitor the output substance (for example, measure its optical reflectivity, dew point, temperature and/or any other suitable variable(s)) at, near and/or downstream from the intersection region 112 to determine measurement data. One or more microsensors are preferably located as close as possible to the intersection region but a sufficient distance away from the intersection region to ensure mixing of the substances before the concentration is detected. In one exemplary non-limiting embodiment, the microsensor may be disposed about one inch to about two inches from the intersection region. This ensures tight coupling between the mixing process and any adjustments made in the supply of the substances, so that the adjusted supply affects the mixing process before a substantial volume of the mixture flows past the intersection region. As a result, the concentrations of substances in the mixture are tightly controlled throughout the mixing process and, in certain embodiments, a mixing tank may be eliminated.

"Measurement data," as used herein, refers to any property of substances that may be measured (for example, by concentration sensor 120 and/or other types of sensors that may be included in mixing apparatus 100). Control circuitry 118 may be configured to determine the concentration of the input substances in the outputted (for example, post-mixing) mixed substance based on the measurement data generated and transmitted by concentration sensor 120. Alternatively or additionally, concentration sensor 120 may be configured to determine the concentration of the input substances in the mixed substance and send concentration data to control circuitry 118. "Concentration data," as used herein, refers to data that indicates a concentration value of a first input substance in a post-mixing substance that is a mixture of the first substance and one or more other substances (for example, optical reflectivity and index of refraction). For example, control circuitry 118 may receive a plurality of concentration values as concentration data from concentration sensor 120. "Concentration value," as used herein, may refer to a single concentration value (for example, a percentage or wt %) that may be used as a basis for post-mixing concentration, as discussed below with respect to FIGS. 8 and 9. Alternatively and/or additionally, concentration value may refer to an average of single concentration values.

Control circuitry 118 may be communicatively connected with concentration sensor 120 to receive the concentration data and/or measurement data via connection 124. Connection 124 may include a direct connection (for example, a twisted pair wiring, fiber optic cabling, coaxial cable, Bluetooth connection, and/or any other type of connection that can be established directly between two devices) and/or an indirect connection (for example, any type of connection that utilizes a router and/or other type of separate communication device). In some embodiments, control circuitry 118 and concentration sensor 120 may likewise communicate via any type of wired or wireless communication means, direct and/or indirect. As such, the components discussed herein can include any hardware, software and/or firmware required to implement the functionality discussed herein. For example, the components discussed herein can be connected directly and/or using a network that may include a public network, such as the Internet, a private network, such as an intranet, or combinations thereof, and may utilize a variety of networking protocols now available or later developed including, but not limited to TCP/IP based networking protocols. In some embodiments, control circuitry 118 and concentration sensor 120 may communicate via communication protocols such as serial and/or parallel data transfers. Other communication interfaces may include point-to-point, on demand, secured transmissions or a custom communications protocol. As such, control circuitry 118 may be separate from the housing and/or remote from concentration sensor 120 in some embodiments.

As discussed above, control circuitry 118 may be configured to receive the concentration data and/or measurement data from concentration sensor 120 via connection 124. The concentration data can be generated by measurement data, and like all data discussed herein may be transmitted as a signal (for example, concentration signals for concentration data and measurement signals for measurement data) using any suitable protocol and/or connection.

Control valve 122 may be configured to form an adjustable "bottleneck" in substance B passage 110 based on instructions from control circuitry 118. The size of the bottleneck affects the flow rate of substance B, where a smaller bottleneck results in a slower flow rate while a larger bottleneck results in a faster flow rate. In some embodiments, control valve 122 may include an actuator and a needle. For example, the actuator may be a stepper motor that is configured to turn precise and controlled amounts (for example, using a worm gear and under the direction of control circuitry 118). Via turning of the stepper motor, the needle may be configured to controllably protrude into (for example, via turning the stepper motor in a first direction) and withdraw from (for example, via turning the stepper motor in a second direction opposite the first direction) substance B passage 108, thus decreasing and increasing an opening size of the control valve, respectively. However, virtually any suitable technique capable of controllably changing the flow rate of substance B within substance B passage 108 may be used. For example, control valve 122 may also be pneumatic or piezoelectric driven.

Although the above example is often referred to herein, control valve 122 can include any suitable component(s) that result in a substance being moved through system 100. For example, control valve 122 may include a valve that allows a particular amount of liquid under pressure to pass through depending on how open or closed the valve is. Additionally or alternatively, control valve 122 can include a pump, fan, and/or any other apparatus that is configured to cause the movement and/or create pressure of a substance. For example, control valve 122 may not have any actual valves but instead be a pumping system that is configured to control the flow of substance A by how much is pumped over a given period of time. As another example, control valve 122 is a valve that is configured to control the rate at which substance A flows as a result of gravity.

In some embodiments, control circuitry 118, concentration sensor 120 and control valve 122 may be configured as a closed-loop-control system. As will be discussed in greater detail below, control circuitry 118 may be configured to determine, store and/or receive a targeted concentration for the mixed substance. Concentration sensor 120 may be configured to measure the mixed substance in real-time as the mixed substance flows through mixed substance passage 114. Based on a first measurement (or a first set of measurements) of the mixed substance, control circuitry 118 may be configured to adjust control valve 122, such as when it is determined that the mixed concentration is not at the targeted concentration or within the targeted concentration range (for example, when the mixed concentration is outside an acceptable margin of error). For example, control circuitry 118 may determine a feedback control value based on the difference between the mixed concentration and the targeted concentration that may be used to adjust control valve 122. Adjusting control valve 122 may result in a change in the flow rate within substance B passage 110. In turn, this may change the concentration of the mixed substance flowing through mixed substance passage 114, which may be detected by concentration sensor 120 via a second measurement (or set of measurements). Accordingly, control circuitry 118 may be configured to determine a second feedback control value (for example, a certain number of stepper motor turns) and/or readjust control valve 122 if it is determined that the new concentration is not the targeted concentration. The process may be repeated until the target concentration is reached and/or a new target concentration is desired. Via the process, one or more control parameters (for example, constants and/or functions) that relate concentration to the feedback control value for mixing apparatus 100 may be generated and updated.

In some embodiments, each measurement and adjustment cycle may take place within any suitable period of time (for example, less than about 100 milliseconds, less than about 10 milliseconds, less than about 1 millisecond, about every second, about every 10 seconds, and the like), thereby allowing for relatively fast response times (as compared to, for example, a once-a-day calibration protocol) for accurately (for example, within about 0.001 wt %) reaching the target concentration or the target concentration range (within one or more margins of error, examples of which are discussed below). As such, some embodiments include a post-mixing concentration sensor whose output signals can be received as inputs by control circuitry (including a processor and other hardware) that is specially configured to control the amount of at least one substance that is mixed with at least one other substance.

In some embodiments, concentration sensor 120 may be configured to measure (or make measurements for determining) characteristic physical properties of a mixed substance, such as concentration, temperature, dew point, and/or any other physical properties. As discussed above, the flow rate of input substances (for example, as may be measured by liquid flow controllers and/or other type(s) of flow measurement sensor(s)) indicates only the volume of the input substances which pass through a given surface per unit time. As such, the flow rate of two or more input substances may only provide a rough indicator of post-mixing output concentration. In that sense, greater mixed accuracy may be achieved using concentration sensor 120 that measures characteristic physical properties of the post-mixing output rather than a flow rate sensor that measures flow rate of an input substance.

Some embodiments of concentration sensor 120 may be configured to measure, for example, optical reflectivity (REF) and temperature of the mixed substance, which may be then used to determine the concentration of one or more substances in the mixed substance. As such, concentration sensor 120 may include one or more optical sensors configured to detect the REF of the mixed substance and one or more thermistors (and/or one or more thermometers) configured to measure the temperature.

Figure 2:
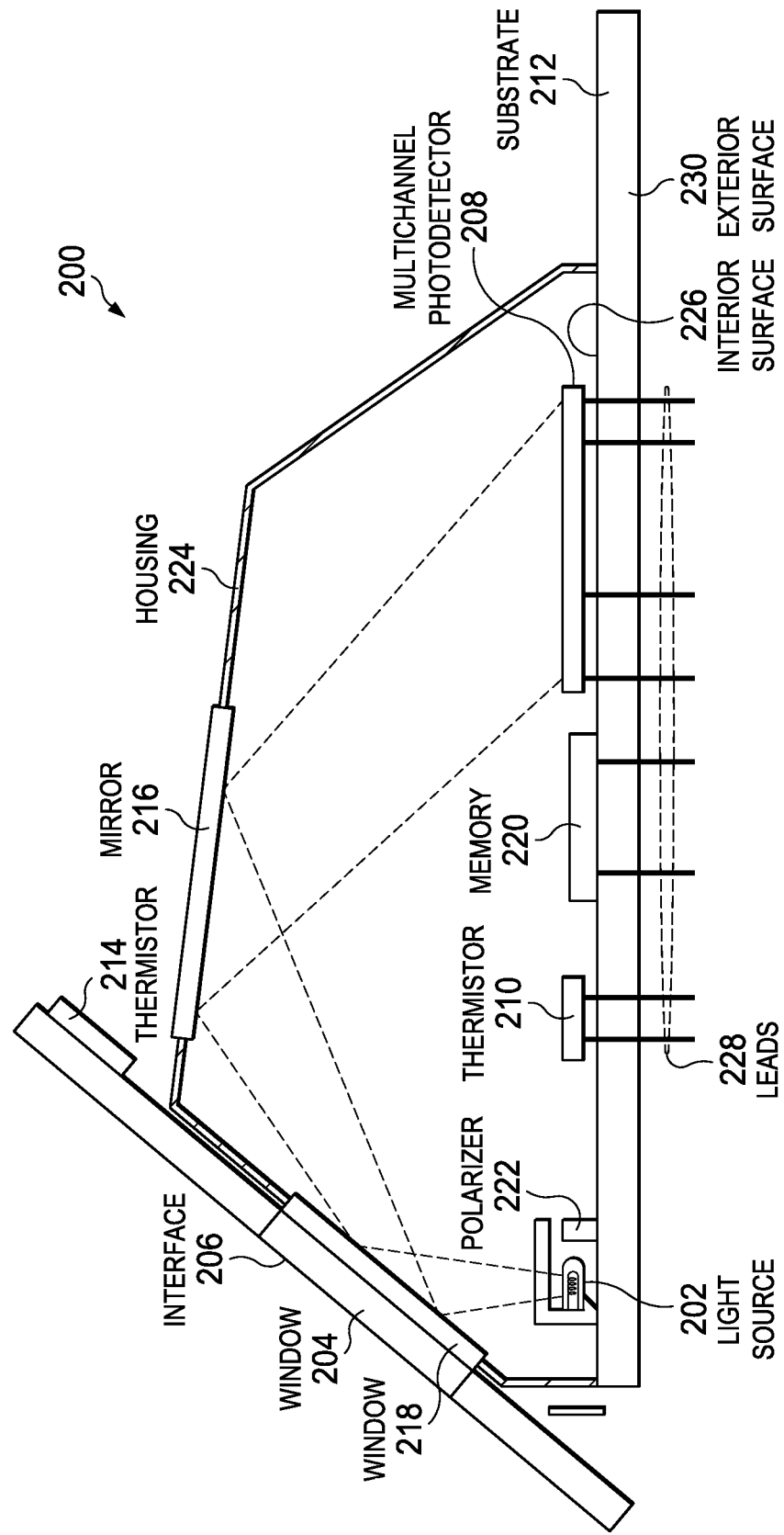
FIG. 2 shows an example optical sensor, configured in accordance with some embodiments.

FIG. 2 shows an example of an optical sensor 200 that may be utilized in concentration sensor 120, configured in accordance with some embodiments. In some embodiments, concentration sensor 120 may further include sensor control circuitry configured to determine the Index of Refraction (IoR), and thereby the concentration of the mixed substance based on measurements by the optical sensor. As such, optical sensor 200 may be a miniaturized, high accuracy (about 0.001 wt %), fast response time (about 1 millisecond), IoR based concentration sensor.

With reference to FIGS. 2 and 3, light emitting from a light source 202 is incident upon window 204 (for example, a sapphire window) that may be in contact with the mixed substance. In accordance with various embodiments, the mixed substance may be static or flowing. Light rays reflect from the interfaces, including window 204 and the sensing surface at window/substance interface 206 onto multi-channel photon detector 208. As discussed above, optical reflectivity data may be generated using the REF geometry. The reflectivity data is sensitive to the optical density change across window/substance interface 206. Accordingly, the optical density of the mixed substance in contact with window 204 is directly related to the measured reflectivity. Since optical density is directly related to IoR, the IoR and thereby the concentration of the mixed substance in contact with window 204 may be determined from the optical reflectivity data.

With reference to FIG. 2, concentration sensor 200 may include light source 202, thermistor 210, and multi-channel photon detector 208 coupled to substrate 212 (for example, a printed circuit board (PCB)), second thermistor 214 on window 204, minor 216, glass (or other suitable material) window 218 (optional), and window 204 (which may be made of any suitable dielectric material such as sapphire, quartz, glass, borosilicate glass, and the like). In some embodiments, memory chip 220 and polarizer 222 may also (optionally) be included. The electro-optic components of concentration sensor 200, including light source 202, multichannel photon detector 208, and thermistor 210 may be encapsulated within a trapezoidal-shaped optical housing 224 and coupled to an interior surface 226 of substrate 212. A plurality of conductive leads 228 may be coupled to exterior surface 230 of substrate 212.

In some embodiments, light source 202 may be a light emitting diode (LED) and window 204 may be constructed of sapphire. Second thermistor 214 may be attached to the front or back of window 204 for convenience. Second thermistor 214 may also be placed inside window 204 or in contact with the mixed substance at or near sensing surface 206.

Window 204 may be placed in direct contact with the mixed substance. In some embodiments, window 204 may be made of sapphire to provide mechanical strength, resistance to substance attack and scratching, durability, optical quality, strength under pressure, machinability and availability. Window 204 may be adhered (for example, via an optical epoxy or any other optically suitable material) to optical housing 224 or to glass window 218. Furthermore, window 204 may be coated with a thin layer (~20-100 Å) of material having sufficiently low density to allow light from light source 202 to pass completely through it into the mixed substance. The thin coating may further protect the surface of window 204 from damage or deterioration, therefore extending the useful life of concentration sensor 200.

As discussed above, concentration sensor 120 may further include (for example, in addition to optical sensor 200) sensor control circuitry. The sensor control circuitry may be configured to operate optical sensor 200 as well concentration and/or measurement data acquisition and/or reporting. For example, the sensor control circuitry may be configured to use numerical methods to extract IoR, and thereby substance concentration, from the REF data and/or temperature data received from optical sensor 200. Furthermore, the sensor control circuitry may perform numerical operations on the "raw" data signal received from optical sensor 200 (for example, via conductive leads 228) to put the raw data signal into proper form for control circuitry 118. These numerical operations may include, but are not limited to, background subtraction and normalizations, measurement data averaging, and the like. In some embodiments, the sensor control circuitry and/or at least some of its function may be implemented in firmware and/or integrated circuitry. Alternatively and/or additionally, control circuitry 118 may be configured to perform one or more functions discussed herein with respect to the sensor control circuitry. Similarly, the sensor control circuitry may be configured to perform one or more functions discussed herein with respect to control circuitry 108.

Any suitable technique may be used to determine the concentration of a substance in a mixture. Certain example structures and techniques for determining concentration are discussed in further detail in commonly-assigned U.S. Pat. No. 7,319,523, issued Jan. 15, 2008, titled "Apparatus for a Liquid Chemical Concentration Analysis System," and commonly-assigned U.S. Patent Publication No. 2010-0296079, published Nov. 25, 2010, titled "Sensing System and Method." The entire contents of both of the above-referenced patent documents are expressly incorporated herein by reference. Furthermore, it is appreciated that concentration sensors that do not use REF and/or IoR techniques may also be used, including, and not limited to conductivity, ultrasonic, UV-visible and near-infrared spectroscopies, electrochemical, and surface plasmon resonance.

Some integrated embodiments, such as mixing apparatus 100, may use a smaller volume of liquid and produce less waste as compared to non-integrated systems for mixing, blending, spiking and other monitor control functions and applications. For example, liquid flow controllers may require a mixing tank that acts as a container for receiving a mixed substance. Because of the slow response time of liquid flow controllers (for example, as may be caused by slower flow rate measurements and the lack of a direct feedback loop between measured post-mixing output concentration and input substance flow rate), a larger volume of mixed liquid may be temporarily stored in the mixing tank while the mixed liquid is reaching target concentration. As such, mixing apparatus 100, by providing more rapid response times than liquid flow controllers, may enable reduced substance volumes for manufacturing and process applications where smallest possible volumes are required. Without a mixing tank, mixing apparatus 100 may also have a smaller footprint than liquid flow controllers. In that sense, some embodiments of mixing apparatus 100 may not include a mixing tank configured to store the post-mixing output chemical until the target concentration is reached.

Figure 1B:
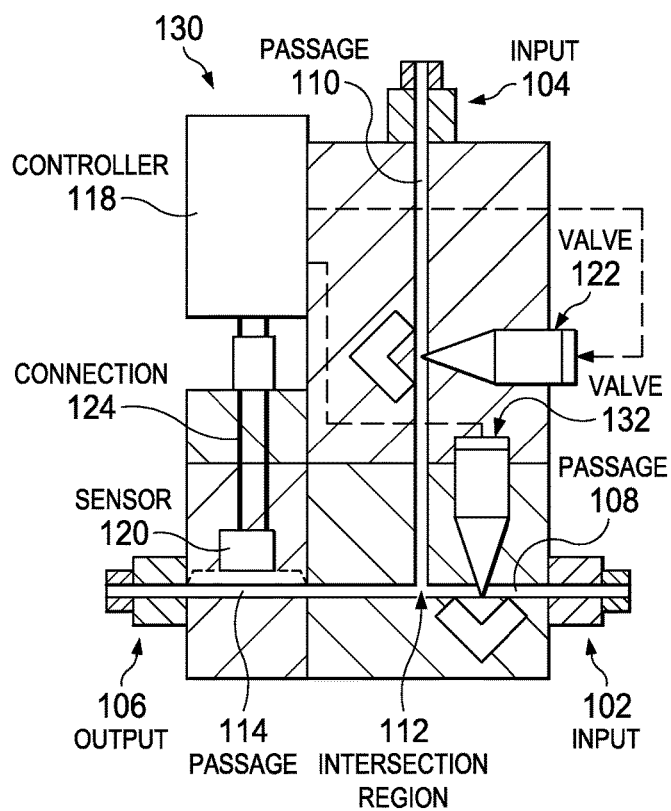
FIG. 1b shows an example of a mixing apparatus, configured in accordance with some embodiments.

FIG. 1b shows an example mixing apparatus 130, configured in accordance with some embodiments. The discussion above regarding components of mixing apparatus 100 may be applicable to mixing apparatus 130 and are not repeated to avoid overcomplicating the disclosure. In this regard, like reference numerals are used to refer to like components throughout the discussion. Mixing apparatus 130 may further include control valve 132, which may be similar to control valve 122. For example, control valve 132 may be communicatively connected with control circuitry 118 and used as a part of the closed-loop-control system.

In some embodiments, control valve 132 may be configured to form an adjustable "bottleneck" in substance A passage 108 based on instructions from control circuitry 118. As such, control circuitry 118 may be configured to control a plurality of control valves, including one or more valves for each substance passage (for example, substance A passage 108 and/or substance B passage 110). In some embodiments, control circuitry 118 may be configured to adjust control valve 132 instead of and/or in addition to control valve 122 when the post-mixing output substance is not at the target concentration.

Figure 1C:
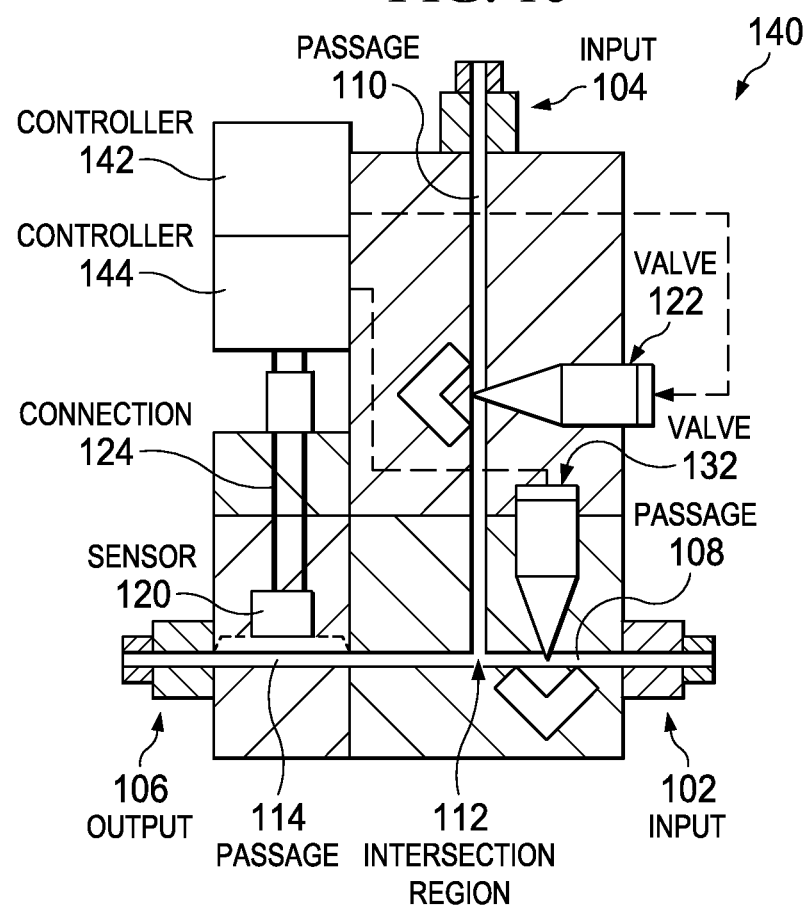
FIG. 1c shows an example of a mixing apparatus, configured in accordance with some embodiments.

FIG. 1c shows an example mixing apparatus 140, configured in accordance with some embodiments. Mixing apparatus 140 includes concentration controllers 142 and 144. Based on concentration data and/or measurement data received from concentration sensor 120, concentration controller 142 may be configured to adjust control valve 122 and concentration controller 144 may be configured to adjust control valve 132. In that sense, some embodiments may include two or more concentration controllers that are configured to control different sets of control valves.

FIG. 4 shows an example mixing apparatus 400, configured in accordance with some embodiments. Mixing apparatus 400 may further include mixer 402. Mixer 402 may be configured to ensure proper substance mixing (for example, of substance A and substance B) prior to the post-mixing measurement of the mixed substance. As such, mixer 402 may be located between intersection region 112, where substance A and substance B may combine to form the mixed substance, and concentration sensor 120, where the mixed substance may be measured.

In some embodiments, mixer 402 may include a static mixer configured to perturb the mixed substance as the mixed substance flows through mixer 402. For example, the static mixer may include one or more secured baffles that partially obstruct and/or direct the mixed substance as it flows through mixer 402. Alternatively or additionally, mixer 402 may include a non-static mixer, such as one or more agitators that move (for example, spin, shake, and the like) within mixer 402 to perturb the mixed substance. As such, it is appreciated that any suitable technique for proper substance mixing may be used with mixer 402. Furthermore, any of the example mixing apparatuses disclosed herein, such as any device positioned at intersect region 112, may include mixer 402, and mixer 402 may include or be replaced with any other type of mixer.

Figure 5:
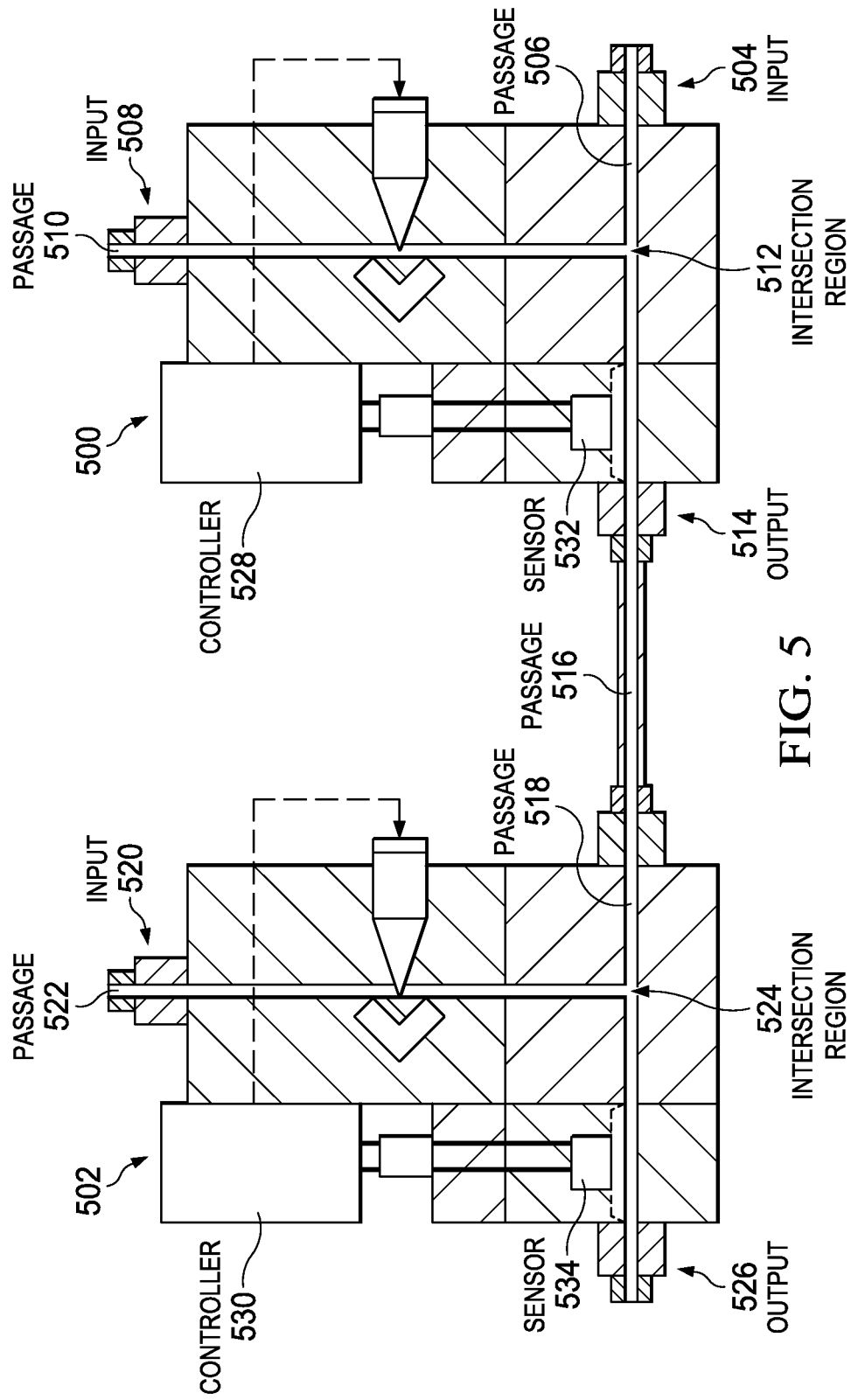
FIG. 5 shows an example of two connected mixing apparatuses, configured in accordance with some embodiments.

FIG. 5 shows example mixing apparatuses 500 and 502 configured to mix a first, second and third input substance ("substance A," "substance B," and "substance C," respectively), configured in accordance with some embodiments. As shown, two or more mixing apparatuses (for example, mixing apparatus 500 and 502), each configured to mix two substances, may be connected to mix three or more substances.

For example, substance A input 504 of mixing apparatus 500 may be configured to receive substance A, which may traverse through substance A passage 506. Substance B input 508 may be configured to receive substance B, which may traverse through substance B passage 510 and combine with substance A at intersection region 512 to form a first mixed substance. The first mixed substance may be output from mixing apparatus 500 via substance output 514.

To mix substance C with the first mixed substance, substance output 514 may be connected with first mixed substance input 516 of mixing apparatus 502. Upon entering via first mixed substance input 516, the first mixed substance may traverse through first mixed substance passage 518. Substance C input 520 may be configured to receive substance C, which may traverse through substance C passage 522 and combine with the first mixed substance at intersection region 524 to form a second mixed substance (for example, including substance A, B, and C in the desired concentrations). The second mixed substance may be outputted from mixing apparatus 502 via substance output 526.

Also as shown in FIG. 5, mixing apparatuses 500 and 502 may each include their own control circuitry 528 and 530, respectively. Such a configuration may allow the mixing apparatuses to serve as scalable modules that may be added or subtracted based on the number of input substances desired in a final mixed substance. It is appreciated that in some embodiments, however, two or more mixing apparatuses may share control circuitry. For example, the shared control circuitry may be located within the housing of one of the mixing apparatuses and/or may be remote from the mixing apparatuses.

In some embodiments, concentration sensor 532 may be configured to create concentration data and/or measurement data by measuring the first mixed substance and to send the concentration data and/or measurement data to control circuitry 528. Concentration sensor 534 may be configured to create concentration data and/or measurement data by measuring the final mixed substance and to send the concentration data and/or measurement data to control circuitry 530. As such, concentration sensors 532 and 534 may be configured to provide concentration and/or measurement data to control circuitry in continuous, real-time while mixing is occurring among the respective substances.

Figure 6:
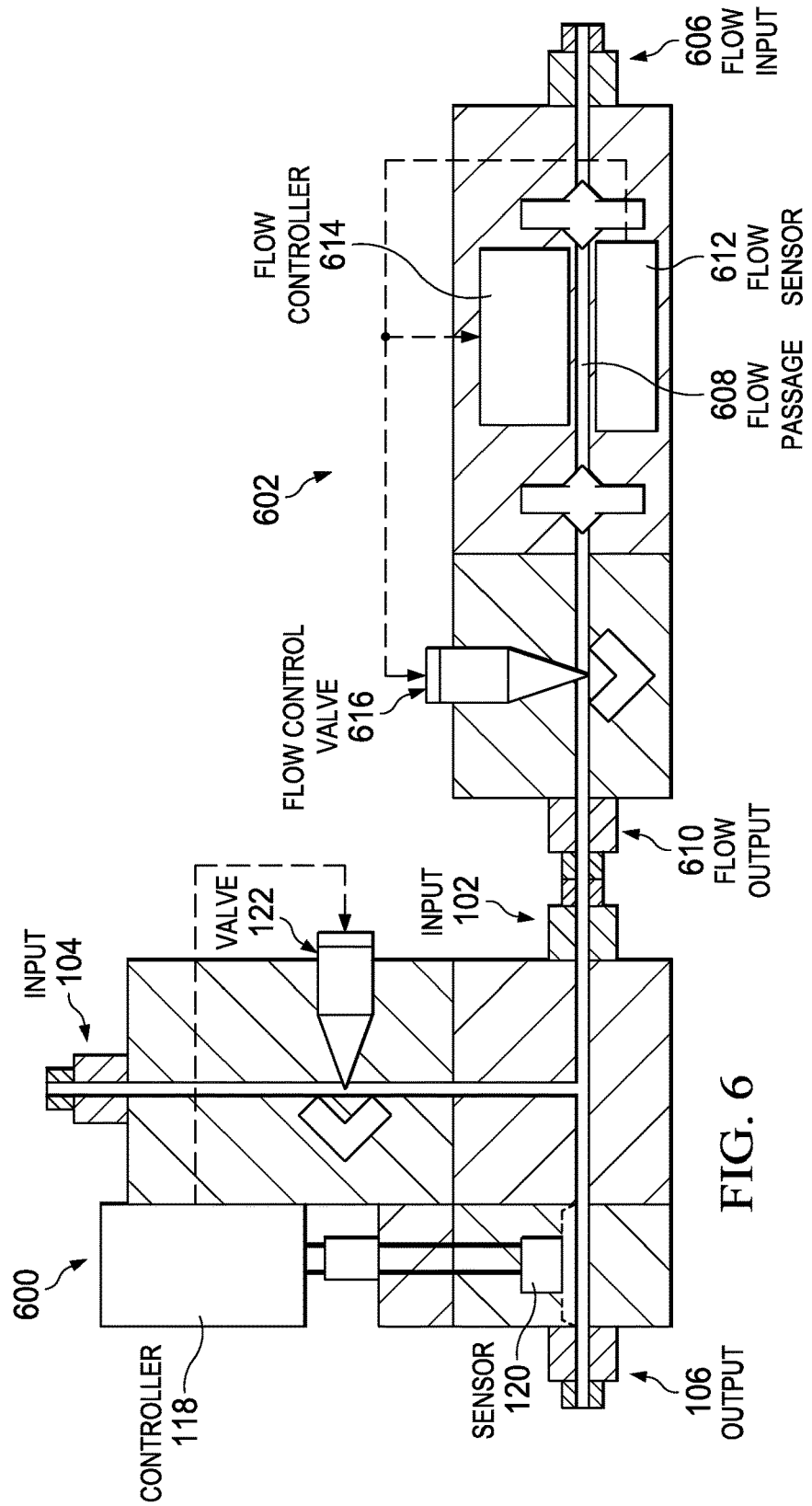
FIG. 6 shows an example of a mixing apparatus connected with a liquid flow controller, configured in accordance with some embodiments.

FIG. 6 shows an example mixing apparatus 600 that includes liquid flow controller 602, configured in accordance with some embodiments. As discussed above with reference to FIG. 1a, one of the input substances (for example, substance A) may be configured to flow at a constant rate. The other input substance (for example, substance B) may be configured to flow at a variable rate that is controlled by the mixing apparatus (for example, mixing apparatus 600).

In some embodiments, liquid flow controller 602 may be configured to control the flow rate of substance A before it is input to mixing apparatus 600 at substance A input 102. As such, liquid flow controller 602 may include flow output 610 that is connected with substance A input 102 of mixing apparatus 600. Liquid flow controller 602 may further include flow input 606, flow passage 608, flow sensor 612, flow controller 614, and flow control valve 616.

Flow input 606 may be configured to receive substance A, which may then flow through liquid flow controller 602 via flow passage 608. Flow sensor 612 may be configured to measure the flow rate of substance A within flow passage 608. Flow sensor 612 may be one of several types, including a time-of-flight ultrasound sensor, a differential pressure sensor, and the like. Based on the measure flow rate, flow controller 614 may be configured to control flow control valve 616 to form an adjustable bottleneck in flow passage 608. The discussion above regarding control valve 122 may be applicable to flow control valve 616. For example, flow control valve 616 may include an actuator and a needle. It is appreciated, however, that virtually any suitable technique capable of controllably changing the flow rate of substance A within flow passage 608 may be used.

Mixing apparatus 600 may differ from liquid flow controller 602 in at least some respects. For example, control circuitry 118 may be configured to control the flow rate of a pre-mixing input substance (for example, via control valve 122) based on the concentration of a post-mixing output substance as measured by concentration sensor 120. On the other hand, flow controller 614 may be configured to control the flow rate of a pre-mixing input substance (for example, via flow control valve 616) based on the flow rate of the pre-mixing input substance as measured by flow sensor 612.

As discussed above, flow rate is not a characteristic physical property of substances (for example, as concentration and temperature), and as such, control based on input substance flow rate may be less accurate (for example, never better than 1% of full scale) than control based on post-mixing output concentration. Furthermore, the use of liquid flow controllers may have other limitations including, drift (therefore requiring regular re-zero and recalibrations), susceptibility to bubbles, clogging, aqua hammer (for example, cycling of pressure build-up and release), low flow limitations (in some embodiments, failure to operate below about 25 mL/min), limited dynamic range, and slow response times between flow rate measurement and adjustment (for example, on the order of seconds versus fractions of a second).

Limited dynamic range may require that multiple liquid flow controllers be employed to cover a given targeted concentration range. For example, in semiconductor (and related) manufacturing, the chemical SC1 (standard clean 1) consists of a mixture of water, ammonia, and hydrogen peroxide and is used to remove organics and particles from semiconductor wafer surfaces. In a given process application, concentrations can range from about 1:1:5 to about 1:1:500, but are not limited to this exemplary range. Liquid flow sensors cannot cover this entire range, thus creating the need for multiple devices. This may lead to significantly increased substance mixing tool costs and apparatus footprints and compromised production throughputs. It is appreciated that the mixing apparatus disclosed herein may be used to overcome these and other disadvantages in liquid flow controllers.

In that sense, liquid flow controller 602 (when included) may be configured to provide a coarse control that is primarily responsible for ensuring that substance A flows at a constant rate (which, as used herein, includes near constant within about 1% to about 2% of flow rate margin of error of liquid flow controller 602). At the same time, mixing apparatus 600 may be ultimately responsible for ensuring that the A-B mixed substance (for example, the mixture of substance A and substance B, as output at substance output 106) is at (which as used herein includes mixed concentrations within the acceptable margin of error of about 0.005% to about 0.01%) the targeted concentration.

In some embodiments, a liquid flow controller may be additionally and/or alternatively connected with substance B input 104 of mixing apparatus 600. Here, the liquid flow controller may be configured to provide a coarse control of substance B flow rate before the flow rate is more finely tuned by mixing apparatus 600.

Figure 7:
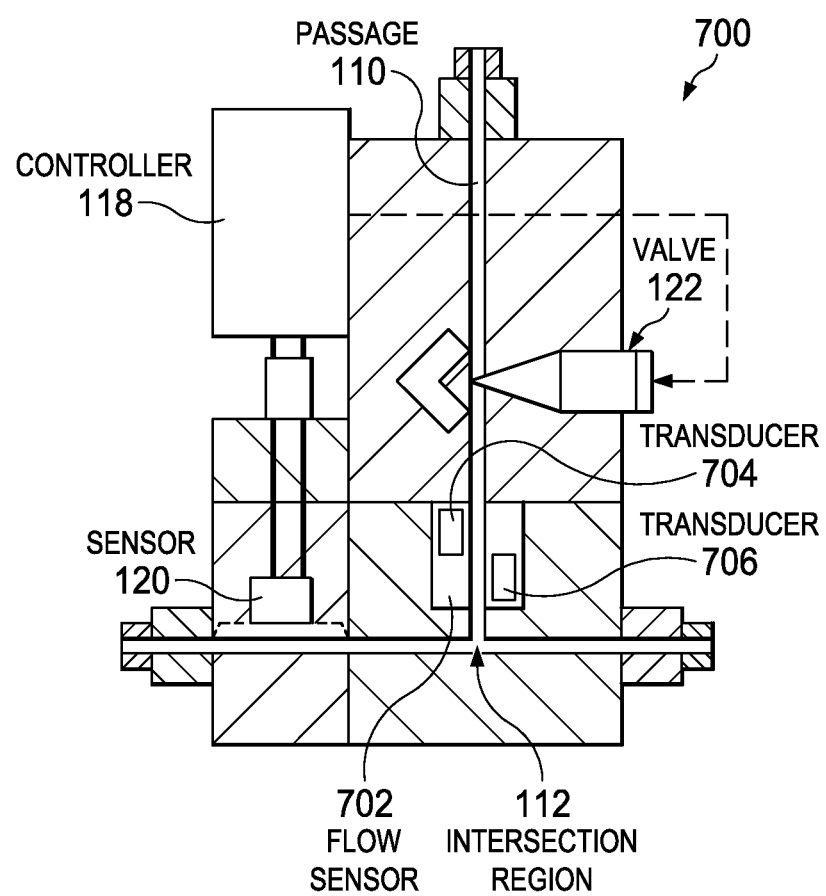
FIG. 7 shows an example of a mixing apparatus that includes a concentration sensor and a flow sensor, configured in accordance with some embodiments.

FIG. 7 shows an example of a mixing apparatus 700 that includes a concentration sensor, namely concentration sensor 120, and a flow sensor, namely flow sensor 702, configured in accordance with some embodiments. Flow sensor 702 may be configured to, among other things, measure the flow rate of an input substance (for example, input substance B) as the input substance traverses through substance B passage 110 before it reaches intersection region 112, where two or more input substances may combine to form the mixed substance.

In some embodiments, flow sensor 702 may include an ultrasonic time-of-flight based flow sensor having piezoelectric transducers 704 and 706. Piezoelectric transducers 704 and 706 may be spaced apart such that a portion of substance B flows between them within substance B passage 110. Piezoelectric transducers 704 and 706 may each be configured to generate and propagate sound waves that are directed through substance B passage 110 and towards the other piezoelectric transducer. The difference in arrival time between sound waves generated by each piezoelectric transducer may be used to determine the flow rate of substance B through substance B passage 110. It is appreciated that flow sensor 702 may be any other type of flow rate sensor, such as a differential pressure sensor.

In some embodiments, control circuitry 118 may be communicatively connected with flow sensor 702. As such, flow sensor 702 may be utilized to control valve 122 in addition and/or alternatively to concentration sensor 120. For example, if flow sensor 702 is used in the closed-loop-control system, then concentration sensor 120 may be configured to report the substance concentration value. Similarly, if concentration sensor 120 is used in the closed-loop-control system, then flow sensor 702 may be configured to report the flow rate. In this manifestation, flexibility, redundancy and thoroughness may be achieved with the use of both flow sensor 702 and concentration sensor 120.

It is appreciated that concentration sensor 120 may provide greater mixing accuracy when used in the closed-loop-control system than flow sensor 702. For example, flow rate measurements may include an uncertainty of approximately about 1% to about 2% of flow rate, which may translate to up to about 4% of concentration uncertainty when the concentration is extrapolated from flow rate measurements. Concentration sensor 120, on the other hand, may measure concentration with only about 0.005% to about 0.01% of uncertainty because concentration may be directly measured using the techniques disclosed herein instead of extrapolated from the flow rate.

In some embodiments, mixing apparatus 700 (or any other mixing apparatus disclosed herein) may be further configured to create simultaneous and real-time measurements of key physical properties of the input substances and/or the post-mixing output substance, including, but not limited to, concentration (C), fluid velocity (υ), fluid flow rate, volume (V), speed of sound in the fluid (cs), temperature (T) and/or pressure (P), to list a few. Using a Doppler (instead of transit time) ultrasonic measurement enables determination of a velocity profile. When combined with a concentration measurement, the viscosity of the fluid may be determined These measurements may further be reported, such as via a display on a display device or sent to a data management system for data analysis (for example, to analyze exceptions, development procedures, optimization, failures, and long-term trends).

Figure 8:
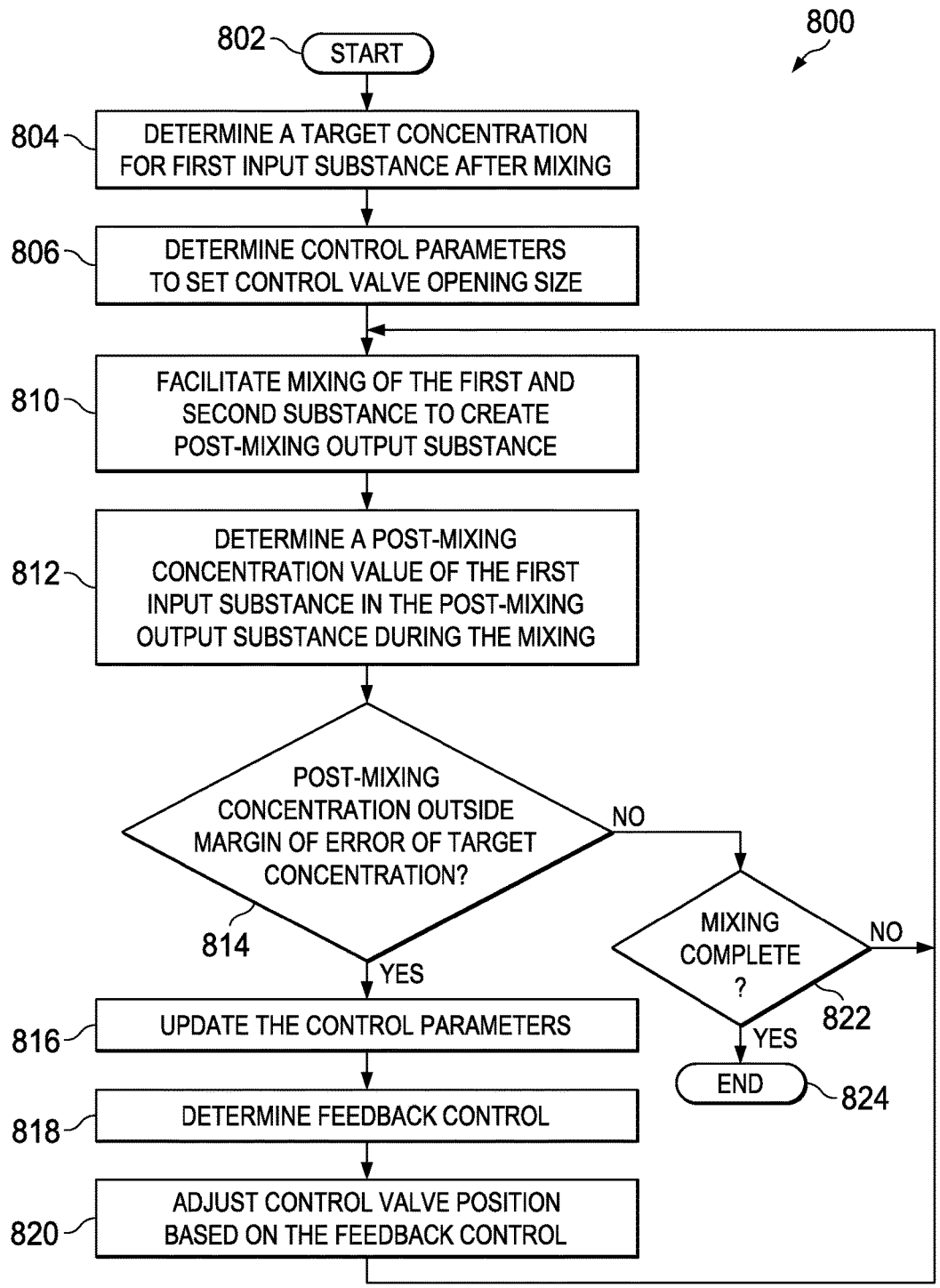
FIG. 8 shows a flow chart of an exemplary method of closed-loop mixing control, performed in accordance with some embodiments.

FIG. 8 shows a flow chart of an exemplary method 800 for closed-loop mixing control, performed in accordance with some embodiments. In some embodiments, method 800 may be performed with the structures shown in FIGS. 1-7 (for example, control circuitry 118) to combine a first input substance (for example, substance A) with a second input substance (for example, substance B) to form an A-B mixed substance at a desired target concentration. Furthermore, method 800 may provide a technique where measured concentration of the mixed substance may be compared with the desired concentration to provide a feedback control value. The feedback control value may be used to control pre-mixing flow rate of substance B, such as by controlling adjustment of a control valve, in a direct feedback loop. Furthermore, method 800 will be explained with reference to FIGS. 1-7.

Method 800 may start at step 802 and proceed to step 804, where a target concentration for substance B within a mixed substance (for example, after substance B has been mixed with substance A) may be determined For example, control circuitry 118 of mixing apparatus 100 may be configured to receive the target concentration, such as via user input device (for example, a keyboard, keypad, touch screen, mouse, and the like).

Alternatively and/or additionally, the target concentration may be programmed into control circuitry 118, determined automatically by circuitry 118 (for example, based on past mixes target concentrations) and/or determined based on any other information.

At step 806, the control circuitry may be configured to determine one or more control parameters to set an initial pre-mixing control valve opening size. As discussed above with reference to FIG. 1 a, control valve 122 may be configured to form an adjustable "bottleneck" in substance B passage 110 based on instructions from control circuitry 118. As such, the control valve may be set at an initial position at step 808 that may be expected to allow substance B to flow within substance B passage 110 at a flow rate that result in the target concentration of the mixed substance.

"Control parameters," as used herein, refers to one or more constants and/or functions that may indicate and/or provide a relationship (for example, a mapping) between control valve opening size and mixed concentration. For example, if the control valve includes a stepper motor, the control parameter may include a function having mixing parameter input(s) that outputs values having units of motor turn count per concentration. In another example, the control parameter may include a constant having units of motor turn count per concentration. Based on a desired target concentration, the control parameter may be used to generate a motor turn count which may be used to set the opening size of the control valve.

A "mixing parameter," as used herein, may refer to a value associated with a factor that may affect the relationship between motor turn count and mixed concentration. In some embodiments, determining the control parameters at step 806 may include receiving mixing parameters (for example, substance flow rates, temperature, substance type and/or viscosity, target concentration, and the like) which may be used to generate, determine and/or select one or more control parameters (for example, from a plurality of control parameters stored in memory).

In some embodiments, example mixing parameters may include substance-related mixing parameters and/or apparatus-related mixing parameters. Substance related mixing parameters may indicate physical characteristics of input substances (for example, substance A and/or substance B), such as viscosity, density, specific gravity, chemical composition, and the like. For example, a substance with high viscosity may indicate that the control valve opening size should be larger than a substance with low viscosity for a given desired target concentration. In some embodiments, substance-related mixing parameters may further include mixing parameters of the environment or background that may affect the substance, such as temperature and/or pressure.

In some embodiments, the flow rate of substance A may be a mixing parameter. For example, flow controller 602 may be used to control the flow rate of substance A before it is input to mixing apparatus 600 at substance A input 102. As such, the mixing apparatus may receive the flow rate of substance A from the flow controller. Alternatively and/or additionally, the mixing apparatus may be configured to monitor and control the flow rate of substance A. For example, the flow rate may be controlled via the size of substance A passage 108, such as by adjusting a control valve that creates an adjustable bottleneck in substance A passage 108.

Apparatus-related mixing parameters may indicate characteristics of the mixing apparatus that may affect flow rate, such as passage size (for example, of substance A passage 108 and/or substance B passage 110), control valve type (for example, stepper motor micro step size, micro steps per full step, and the like), mixing apparatus type, and/or other system component-related factors. In some embodiments, the apparatus-related mixing parameters may affect the functionality of the flow controller and calibration of the system both in real-time, namely while operating to compensate for the variable changing (such as wear-and-tear related precision issues), and during non-operational times (for example, based on what other systems experience and/or what should be expected post-maintenance). For example, as the mixing apparatus operates, the control valve(s) may be worn down (for example, like a river running through a canyon). While it may take months or even years before a control valve is sufficiently worn to require replacement, the level of precision and accuracy of the concentration sensor may pick up differences on a weekly or even daily amount of wear-and-tear. For example, a control valve moved open based on a certain number of motor turn counts may be accurate for a particular target concentration one day, but may be inaccurate a week later. These changes are not limited to just operational issues like wear-and-tear, but may also be affected by non-operational events, such component replacement (for example, a different control valve and/or stepper motor may be installed, which may have more or less wear than the replaced component).

Mixing parameters may be determined using any suitable technique. For example, some mixing parameters may be stored in a memory and retrieved from the memory. Additionally and/or alternatively, one or more mixing parameters may be measured (for example, by concentration sensor 120 prior to the mixing) and/or input by the user.

At step 810, the control circuitry may be configured to facilitate mixing of substance B and substance A to form the post-mixing output substance. For example, with reference to FIG. 1a, substance A may traverse through substance A passage 108 and substance B may traverse through substance B passage 110. Substance A passage 108 and substance B passage 110 may meet at intersection region 112, where substance A and substance B may combine to form the mixed substance. The mixed substance may traverse through mixed substance passage 114. In some embodiments, a mixer (for example, mixer 402 shown in FIG. 4) may further positioned between intersection region 112, where substance A and substance B may combine to form the mixed substance, and concentration sensor 120, where the mixed substance may be measured. The mixer may be configured to ensure proper substance mixing.

At step 812, the control circuitry may be configured to determine a post-mixing concentration value of substance B in the post-mixing output substance during the mixing of substance A and substance B. The control circuitry may be configured to determine the post-mixing concentration value continuously, periodically and/or upon receiving user instructions. In some embodiments, for each determination of the post-mixing concentration value, optical sensor 200 may be configured to measure the optical reflectivity (REF) and temperature of the mixed substance. Based on these measurements, concentration sensor 120 and/or control circuitry 118 may be configured to determine the Index of Refraction (IoR). Based on the IoR, concentration sensor 120 and/or control circuitry 118 may be configured to determine the concentration value. As such, the control circuitry may be configured to receive the post-mixing concentration values of substance B (for example, as concentration data) from the concentration sensor in some embodiments. Certain exemplary techniques that may be used at step 812 for determining the concentration value based on post-mixing output substance measurements are discussed in greater detail in commonly-assigned U.S. Pat. No. 7,319,523, issued Jan. 15, 2008, titled "Apparatus for a Liquid Chemical Concentration Analysis Systems," the entire contents of which are expressly incorporated herein by reference.

At step 814, a determination may be made as to whether the post-mixing concentration value of substance B, as may be determined by monitoring the post-mixing concentration value, is outside a predetermined target concentration range or a margin of error of the target concentration. For example, the concentration of substance B in the post-mixing output substance determined at step 814 may be compared with the target concentration for substance B determined at step 804. In some embodiments, a difference, $\varepsilon$, between the post-mixing concentration and the target concentration may be determined Furthermore, the post-mixing concentration and other measurement data (for example, measured REF, IoR, temperature, and the like) may be shown on a display device.

"Post-mixing concentration value," as used herein, may refer to a single post-mixing concentration value or an average of two or more single concentration values. In some embodiments, as discussed below with reference to FIG. 9, a predetermined number of post-mixing concentration values may be averaged at step 812 to determine an average post-mixing concentration value. The average post-mixing concentration value may then be compared with the target concentration at step 814 rather than a single post-mixing concentration value. In some embodiments, selected concentration values may be used from the post-mixing concentration values determined at step 812. For example, the control circuitry may be configured to sample the post-mixing concentration values at regular and/or intermittent times to make the determination at step 814.

It is appreciated that the determination at step 814 may include a determination as to whether the post-mixing concentration is within an acceptable amount away from the target concentration. In some embodiments, the margin of error may be determined by the precision of the concentration sensor. For example, if the concentration sensor is able to measure concentration within about 0.001 wt, then the determination at step 814 may be performed to ensure that the post-mixing concentration and the target concentration do not differ by more than about 0.001 wt. Additionally and/or alternatively, a user may be allowed to set the margin of error.

In some embodiments, the determination at step 814 may use two or more different margins of error. For example, an average margin of error may be applied to the average post-mixing concentration while a second margin of error may be applied to individual post-mixing concentration values. If the target concentration is 10.00%, and the average margin of error is 0.09%, any averaged post-mixing concentration outside of 10.09% or 9.91% may cause an adjustment. Furthermore, if the second margin of error is about 0.2%, any individual post-mixing concentration value outside 10.2% or 9.8% may cause an adjustment, even if the average post-mixing concentration is within the acceptable range of 9.91-10.09%. Such embodiments may allow the mixing apparatus to achieve a faster response time in correcting for large single deviations from the target concentration, such as may be caused by a sudden change in the concentration of the post-mixing output substance.

If the post-mixing concentration is not at the target concentration or the target concentration range (for example, within the acceptable margin(s) of error), method 800 may proceed to step 816. At step 816, the control parameters may be updated based on the post-mixing concentration. In some embodiments, control circuitry 118 may further include a proportional-integral-derivative (PID) controller (or be configured to include PID functionality). As such, example control parameters may include the proportional value, $k_p$, the integral value, $k_i$, and/or the derivative value, $k_d$, in PID control. Here, difference between the expected effect of previous control parameters on concentration and the posting concentration may be used to tune the control parameters. For example, $k_p$ may be increased if the post-mixing concentration is less than the desired target concentration, meaning that a greater number of motor turns that increase the control valve opening size may be needed.

It is appreciated that dynamic updating of the control parameters may provide for increased response time because fewer feedback cycles may be needed to reach the targeted concentration. Furthermore, dynamic updating may allow for fewer or no pre-mixing recalibrations (for example, before each use, as may be required for liquid flow controllers) because the control circuitry may adjust for changes (for example, of the control valve from wear-and-tear or replacement) to the mixing apparatus as they occur over time.

At step 818, a feedback control value may be determined For example, control circuitry 118 may be configured to calculate a feedback control value, q(t), using a proportional integral derivative set forth in Equation 1:

$$q(t) = k_p \varepsilon(t) + k_d \frac{d\varepsilon}{dt} + k_i \int \varepsilon dt \qquad \text{Equation 1}$$

where values $\varepsilon$ is the difference between the measured post-mixing concentration and the target concentration as a function of time, $k_p$ is the proportional value, $k_i$ is the integral value and $k_d$ is the derivative value. In some embodiments, the feedback control value may use control parameters (for example, $k_p$, $k_i$ and $k_d$) that were updated at step 816. In some embodiments, feedback control value q(t) may have units of motor turn counts and may provide a value that is used to control the pre-mixing control valve.

At step 820, the opening size of the pre-mixing control valve may be adjusted based on the feedback control value. For example, control circuitry 118 may be configured to cause the actuator of control valve 122 to turn in a suitable direction (for example, a certain number of motor turn counts as determined by the feedback control value) to cause the needle to protrude into and/or withdraw from substance B passage 108, thus decreasing and increasing the size of the adjustable bottleneck, respectively, and thereby the flow rate of substance B. As such, the flow rate of substance B may be increased when the post-mixing concentration is less than the target concentration and decreased when the post-mixing concentration is greater than the target concentration.

In some embodiments, adjusting the control valve may be independent from a measured flow rate of the substance B within substance B passage 110, such as by a flow sensor. As such, unlike liquid flow controllers that may control a valve based on measured flow rate, greater accuracy may be achieved by using post-mixing concentration as the basis for adjusting the control valve.

After step 820, method 800 may return to step 810, where mixing may continue and the concentration of substance B in the post-mixing output substance may be determined again using the techniques described above.

Returning to step 814, if the post-mixing concentration is at the target concentration, method 800 may proceed to step 822, where a determination may be made as to whether the mixing is complete. If the mixing is determined to not be complete (for example, the concentration sensor detects the post-mixing output substance is still flowing), method 800 may return to step 810, where the mixing may continue and the concentration of substance B in the post-mixing output substance may be determined In that sense, concentration controller 118 may be configured to continuously monitor the post-mixing concentration to determine whether the post-mixing concentration is outside a predetermined target concentration range or a margin of error of the target concentration and to adjust the control valve position accordingly, in real-time, as the mixing takes place. If the mixing is determined to be complete at step 822, method 800 may end at step 824.

Figure 9:
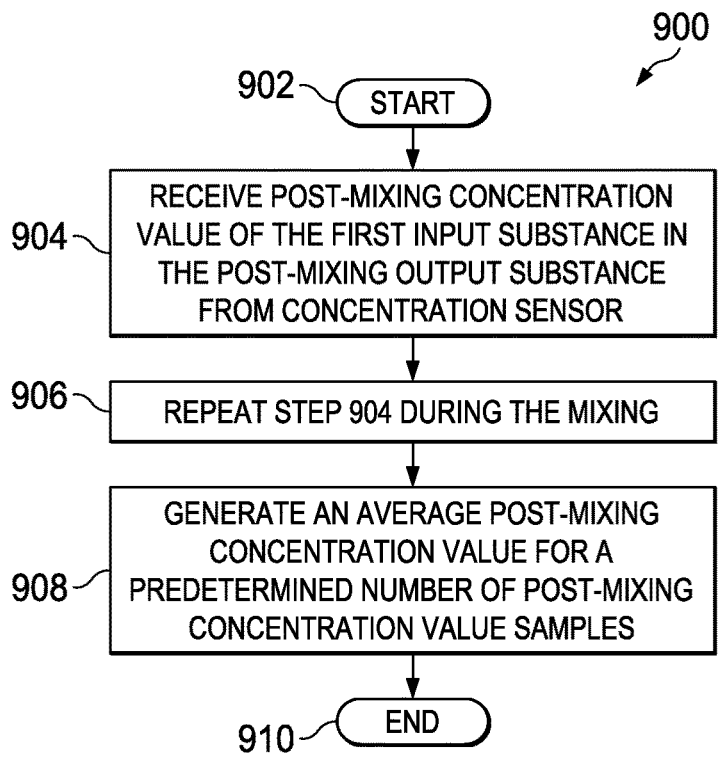
FIG. 9 shows a flow chart of an exemplary method of determining an average post-mixing concentration, performed in accordance with some embodiments.

FIG. 9 shows a flow chart of an exemplary method 900 for generating an average post-mixing concentration value, in accordance with some embodiments. As discussed above, a predetermined number of post-mixing concentration values may be averaged at step 812 of method 800 to determine an average post-mixing concentration value. The average post-mixing concentration value may then be compared with the target concentration at step 814.

Method 900 may begin at step 902 and proceed to step 904, where the control circuitry may receive a post-mixing concentration value of the first input substance in the post-mixing output substance from the concentration sensor. At step 906, step 904 may be repeated for a predetermined number of times. The discussion above at step 812 of method 800 may be applicable at step 904 and step 906. For example, based on measurements by concentration sensor 120 during the mixing of substance A and substance B, control circuitry 118 may be configured to continuously determine and/or receive post-mixing concentration values of substance B in the post-mixing output substance. After a predetermined number of concentration values, method 900 may proceed to step 908.

At step 908, the control circuitry may be configured to generate an average post-mixing concentration value for the predetermined number of concentration values. In some embodiments, the predetermined number of concentration values that are averaged may be determined by the response time of control valve 122 and/or the response time of concentration sensor 120. For example, it is appreciated from the disclosure provided herein that concentration sensor 120 may be able to generate concentration values at a faster rate (for example, every millisecond) than the time it takes control valve 122 to adjust control valve opening size (for example, via the turning of the actuator and/or stepper motor). Additionally and/or alternatively, the predetermined number of concentration values that are averaged may be based on the reliability of the concentration sensor. For example, averages may be taken to avoid problems caused by an occasional inaccurate concentration value that may otherwise cause the post-mixing concentration to shift away from the target concentration. Method 900 may end at step 910.

Figure 10:
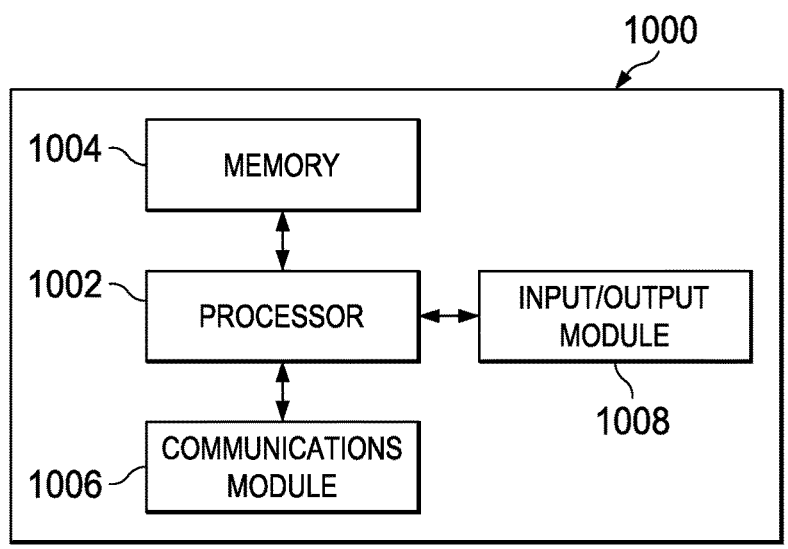
FIG. 10 shows a schematic block diagram of circuitry, configured in accordance with some embodiments.

FIG. 10 shows a schematic block diagram of circuitry 1000, some or all of which may be included in, for example, a mixing apparatus (for example, control circuitry 118 and/or concentration sensor 120 of mixing apparatus 100). As illustrated in FIG. 10, in accordance with some example embodiments, circuitry 1000 may include various means, such as one or more processors 1002, memories 1004, one or more communications modules 1006, and/or one or more input/output modules 1008.

As referred to herein, "module" includes hardware, software and/or firmware configured to perform one or more particular functions such as those included in methods 800 and 900. In this regard, the means of circuitry 1000 as described herein may be embodied as, for example, circuitry, hardware elements (for example, a suitably programmed processor, combinational logic circuit, and/or the like), a computer program product comprising computer-readable program instructions stored on a non-transitory computer-readable medium (for example, memory 1004) that is executable by a suitably configured processing device (for example, processor 1002), or some combination thereof.

Processor 1002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 10 as a single processor, in some embodiments, processor 1002 comprises a plurality of processors and/or processing circuitry. The plurality of processors may be embodied on a single computing device or may be distributed across a plurality of computing devices collectively configured to function as circuitry 1000. The plurality of processors may be in operative communication with each other and may be collectively configured to perform one or more functionalities of circuitry 1000 as described herein. In an example embodiment, processor 1002 is configured to execute instructions stored in memory 1004 or otherwise accessible to processor 1002. These instructions, when executed by processor 1002, may cause circuitry 1000 to perform one or more of the functionalities of circuitry 1000 as described herein.

Whether configured by hardware, firmware/software methods, or by a combination thereof, processor 1002 may comprise an entity capable of performing operations according to embodiments of the present invention while configured accordingly. Thus, for example, when processor 1002 is embodied as an ASIC, FPGA or the like, processor 1002 may comprise specifically configured hardware for conducting one or more operations described herein. As another example, when processor 1002 is embodied as an executor of instructions, such as may be stored in memory 1004, the instructions may specifically configure processor 1002 to perform one or more algorithms and operations described herein, such as those discussed in connection with FIGS. 8 and 9.

Memory 1004 may comprise, for example, volatile memory, non-volatile memory, or some combination thereof. Although illustrated in FIG. 10 as a single memory, memory 1004 may comprise a plurality of memory components. The plurality of memory components may be embodied on a single computing device or distributed across a plurality of computing devices. In various embodiments, memory 1004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1004 may be configured to store information, data (for example, the control parameters and/or constants for setting control valve position), applications, instructions, or the like for enabling circuitry 1000 to carry out various functions in accordance with example embodiments of the present invention. For example, in at least some embodiments, memory 1004 is configured to buffer input data for processing by processor 1002. Additionally or alternatively, in at least some embodiments, memory 1004 is configured to store program instructions for execution by processor 1002. Memory 1004 may store information in the form of static and/or dynamic information. This stored information may be stored and/or used by circuitry 1000 during the course of performing its functionalities.

Communications module 1006 may be embodied as any device or means embodied in circuitry, hardware, a computer program product comprising computer readable program instructions stored on a computer readable medium (for example, memory 1004) and executed by a processing device (for example, processor 1002), or a combination thereof that is configured to receive and/or transmit data from/to another device, such as, for example, a second circuitry 1000 and/or the like. In some embodiments, communications module 1006 (like other components discussed herein) can be at least partially embodied as or otherwise controlled by processor 1002. In this regard, communications module 1006 may be in communication with processor 1002, such as via a bus. In some embodiments, communications module 1006 may include, for example, an antenna, a transmitter, a receiver, a transceiver, network interface card and/or supporting hardware and/or firmware/software for enabling communications with another computing device. Communications module 1006 may be configured to receive and/or transmit any data that may be stored by memory 1004 using any protocol that may be used for communications between computing devices. Communications module 1006 may additionally or alternatively be in communication with the memory 1004, input/output module 1008 and/or any other component of circuitry 1000.

Input/output module 1008 may be in communication with processor 1002 to receive an indication of a user input and/or to provide an audible, visual, mechanical, or other output to a user. Some example visual outputs that may be displayed on a visual display device by circuitry 1000 are discussed in connection with methods 800 and 900. Such exemplary visual outputs include, but are not limited to, post-mixing concentration, target concentration, measured optical reflectivity (REF), index of refraction (IOR), temperature, control parameters and/or constants, and the like. In that sense, input/output module 1008 may further include support, for example, for a keyboard, keypad, a mouse, a joystick, a display, a touch screen display, and/or other input/output mechanisms. Input/output module 1008 may be in communication with memory 1004, communications module 1006, and/or any other component(s), such as via a bus. Although more than one input/output module and/or other component can be included in circuitry 1000, only one is shown in FIG. 10 to avoid overcomplicating the drawing (like the other components discussed herein).

In some embodiments, a series of computer-readable program code portions are embodied in one or more computer program products and can be used, with a computing device and/or other programmable apparatus, to produce machine-implemented processes. As will be appreciated, any such computer program instructions and/or other type of code may be loaded onto a computer, processor or other programmable apparatus circuitry to produce a machine, such that the computer, processor, other programmable circuitry that execute the code on the machine create the means for implementing various functions, including those described herein.

Embodiments of the present invention have been described above with reference to a block diagram and flow chart illustration of methods, apparatuses, and computer program products. It will be understood that each block of the circuit diagram and process flow chart, and combinations of blocks in the circuit diagram and process flowchart, respectively, can be implemented by various means including computer program instructions. These computer program instructions may be loaded onto a general purpose computer, special purpose computer, or other programmable data processing apparatus, such as processor 1002 discussed above with reference to FIG. 10, to produce a machine, such that the computer program product includes the instructions which execute on the computer or other programmable data processing apparatus create a means for implementing the functions specified in the flowchart block or blocks.

These computer program instructions may also be stored in one or more non-transitory computer-readable storage media (for example, memory 1004) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein. The non-transitory computer-readable media may include non-transitory storage hardware, non-transitory storage device or non-transitory computer system memory that may be accessed by a controller, a microcontroller, a computational system or a module of a computational system to encode thereon computer-executable instructions or software programs. The non-transitory computer-readable media may be accessed by a computational system or a module of a computational system to retrieve and/or execute the computer-executable instructions or software programs encoded on the media. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mixing system, comprising:
    a first mixing conduit comprising an intersection region where a first supply conduit and a second supply conduit meet;
    the first supply conduit coupled to and disposed upstream of the first mixing conduit, the first supply conduit including a bore for supplying a first substance to the first mixing conduit;
    a first flow control device provided at the first supply conduit, the first flow control device configured to selectively adjust an opening of the bore of the first supply conduit;
    the second supply conduit coupled to and disposed upstream of the first mixing conduit, the second supply conduit including a bore for supplying a second substance to the first mixing conduit;
    a first set of one or more sensors provided at a location at or near the intersection of the first mixing conduit for determining a concentration of the first substance in a first mixture produced by mixing of the first and second substances; and
    first control circuitry operatively coupled to the first set of one or more sensors and to the first flow control device, the first control circuitry programmed to automatically control the first flow control device to adjust a flow rate of the first substance based on on the concentration of the first substance in the first mixture and based on one or more physical characteristics of at least one of the plurality of substances selected from a group comprising viscosity, density, specific gravity, chemical composition, temperature and pressure, wherein the flow rate of the first substance is adjusted before a substantial volume of the first substance flows through first mixing conduit.

2. The mixing system of claim 1, wherein the first control circuitry is programmed to: determine a concentration value of the first substance in the first mixture based on one or more detected characteristics of the first mixture;
    compare the concentration value of the first substance to a first target concentration range for the first substance; and
    based on a determination that the concentration value of the first substance falls outside the first target concentration range, automatically control the first flow control device to adjust the opening of the bore of the first supply conduit.

3. The mixing system of claim 2, wherein the first set of one or more sensors comprises:

an optical system configured to detect an optical reflectivity of the first mixture; and a thermistor or a thermometer for detecting a temperature of the first mixture;
    wherein the first control circuitry is programmed to determine an index of refraction of the first mixture based on the optical reflectivity and the temperature of the first mixture, and to determine the concentration value of the first substance in the first mixture based on the index of refraction.

4. The mixing system of claim 2, wherein the first control circuitry is programmed to control the first flow control device based on the concentration value of the first substance in the first mixture and based on one or more physical characteristics of at least one of the plurality of substances, wherein the one or more physical characteristics are selected from a group comprising viscosity, density, specific gravity, chemical composition, temperature and pressure.

5. The mixing system of claim 1, wherein one or more of the sensors are operated at predetermined intervals to detect the one or more characteristics of the first mixture during mixing of the first and second substances in the first mixing conduit.

6. The mixing system of claim 1, further comprising:
    a second flow control device provided at the second supply conduit, the second flow control device configured to selectively adjust an opening of the bore of the second supply conduit;
    wherein the first control circuitry is operatively coupled to the second flow control device, the first control circuitry programmed to automatically control the second flow control device to adjust a flow rate of the second substance based on the one or more detected characteristics of the first mixture at the first mixing conduit.

7. The mixing system of claim 6, wherein the first control circuitry is programmed to: determine a concentration value of the second substance in the first mixture based on the one or more detected characteristics of the first mixture;
    compare the concentration value of the second substance to a second target concentration range for the second substance; and
    based on a determination that the concentration value of the second substance falls outside the second target concentration range, automatically control the second flow control device.

8. The mixing system of claim 1, further comprising:
    a second mixing conduit coupled to and disposed downstream of the first mixing conduit;
    a third supply conduit coupled to and disposed upstream of the second mixing conduit, the third supply conduit including a bore for supplying a third substance to the second mixing conduit;
    a third flow control device provided at the third supply conduit, the third flow control device configured to selectively control an opening of the bore of the third supply conduit; a second set of one or more sensors provided at the second mixing conduit for detecting one or more characteristics of a second mixture produced by mixing of the first mixture and the third substance; and
    second control circuitry operatively coupled to the second set of one or more sensors and to the third flow control device, the second control circuitry programmed to
    automatically control the third flow control device to adjust a flow rate of the third substance based on the one or more detected characteristics of the second mixture at the second mixing conduit.

9. The mixing system of claim 1, further comprising:
a flow control sensor provided at the second supply conduit, the flow control sensor configured to detect a flow rate of the second substance in the second supply conduit; and a second flow control device provided at the second supply conduit, the second flow control device configured to selectively adjust an opening of the bore of the second supply conduit based on the flow rate detected by the flow control sensor.

\* \* \* \* \*